(12) United States Patent
Chapman, Jr.

(10) Patent No.: US 7,063,763 B2
(45) Date of Patent: Jun. 20, 2006

(54) TUBULAR MEMBERS INTEGRATED TO FORM A STRUCTURE

(76) Inventor: W. Cullen Chapman, Jr., 414 Second St., No. 207, Hermosa Beach, CA (US) 90254-4669

( * ) Notice: Subject to any disclaimer, the term of this patent is extended or adjusted under 35 U.S.C. 154(b) by 367 days.

(21) Appl. No.: 10/366,606

(22) Filed: Feb. 13, 2003

(65) Prior Publication Data

US 2003/0173460 A1    Sep. 18, 2003

Related U.S. Application Data

(62) Division of application No. 09/489,041, filed on Jan. 21, 2000, now Pat. No. 6,655,633.

(51) Int. Cl.
*B65H 81/00* (2006.01)
*B32B 31/00* (2006.01)

(52) U.S. Cl. .................. 156/175; 156/169; 156/173; 156/185

(58) Field of Classification Search ............. 156/169, 156/173, 175, 185
See application file for complete search history.

(56) References Cited

U.S. PATENT DOCUMENTS

| | | | |
|---|---|---|---|
| 1,677,714 A * | 7/1928 | Frease ..................... 428/188 |
| 2,029,048 A | 1/1936 | Atwood | |
| 2,540,482 A | 2/1951 | Hervey | |
| 2,593,714 A | 4/1952 | Robinson | |
| 3,023,860 A | 3/1962 | Ellzey | |
| 3,645,883 A | 2/1972 | Figge | |
| 3,764,431 A | 10/1973 | Kramer et al. | |
| 3,779,847 A | 12/1973 | Turner | |
| 3,902,944 A | 9/1975 | Ashton et al. | |
| 4,051,289 A * | 9/1977 | Adamson .................. 428/113 |
| 4,079,903 A | 3/1978 | Ashton et al. | |
| 4,223,053 A * | 9/1980 | Brogan ..................... 428/188 |
| 4,241,117 A | 12/1980 | Figge | |
| 4,350,728 A | 9/1982 | Huang et al. | |
| 4,411,940 A | 10/1983 | Derkacs et al. | |
| 4,461,855 A | 7/1984 | Phillips | |
| 4,512,835 A | 4/1985 | Gardiner | |
| 4,565,595 A | 1/1986 | Whitener | |
| 4,710,412 A | 12/1987 | Darrieux | |
| 4,776,885 A | 10/1988 | Nakagawa et al. | |
| 4,867,614 A | 9/1989 | Freed | |
| 5,059,654 A | 10/1991 | Hou et al. | |
| 5,108,810 A | 4/1992 | Williams | |
| 5,118,571 A | 6/1992 | Petersen | |
| 5,165,627 A | 11/1992 | Amano et al. | |
| 5,200,012 A * | 4/1993 | Blavignac et al. ......... 156/169 |
| 5,200,251 A | 4/1993 | Brand | |
| 5,223,067 A | 6/1993 | Hamamoto et al. | |
| 5,253,824 A | 10/1993 | Halila et al. | |

(Continued)

OTHER PUBLICATIONS

Mel Schwartz, "Composite Materials Handbook", 1992, 2nd ed., pp. 4.36-4.42 and 5.15-5.24.

*Primary Examiner*—Jeff H. Aftergut

(57) ABSTRACT

Integrally stiffened and formed, load carrying structures comprising a plurality of elongated thin-walled tubes placed co-extensively in a complementary side-by-side fashion which together form a hollow structure having a desired external contour. Integral skins forming the external and internal surfaces of the structure cooperatively therewith. The structure can be formed with an underlying internal support member spanning the interior of the load carrying structure, thereby connecting opposite sides of the structure together. Also, each of the tubes are wound with fibers in controlled orientations generally paralleling the direction of the loads applied to the tubes to optimize the strength to weight ratio of the tubes.

35 Claims, 15 Drawing Sheets

U.S. PATENT DOCUMENTS

| | | |
|---|---|---|
| 5,269,657 A | 12/1993 | Garfinkle |
| 5,277,958 A | 1/1994 | Tomkins |
| 5,332,178 A | 7/1994 | Williams |
| 5,435,869 A | 7/1995 | Christensen |
| 5,469,686 A | 11/1995 | Pykiet |
| 5,474,632 A | 12/1995 | Ray et al. |
| 5,496,002 A | 3/1996 | Schutze |
| 5,533,693 A | 7/1996 | Abildskov |
| 5,547,629 A | 8/1996 | Diesen et al. |
| 5,632,940 A | 5/1997 | Whatley |
| 5,651,850 A | 7/1997 | Turner et al. |
| 5,660,910 A | 8/1997 | Hoyt et al. |
| 5,707,231 A | 1/1998 | Watt et al. |
| 5,811,186 A | 9/1998 | Martin et al. |
| 5,849,052 A | 12/1998 | Barber, Jr. |
| 5,885,683 A | 3/1999 | Swift |
| 5,888,608 A | 3/1999 | Tsai |
| 5,899,785 A | 5/1999 | Groten et al. |
| 5,970,583 A | 10/1999 | Groten et al. |
| 5,972,463 A | 10/1999 | Martin et al. |
| 5,989,713 A | 11/1999 | Naaman |
| 6,050,523 A | 4/2000 | Kraenzien |
| 6,655,633 B1 | 12/2003 | Chapman, Jr. |

\* cited by examiner

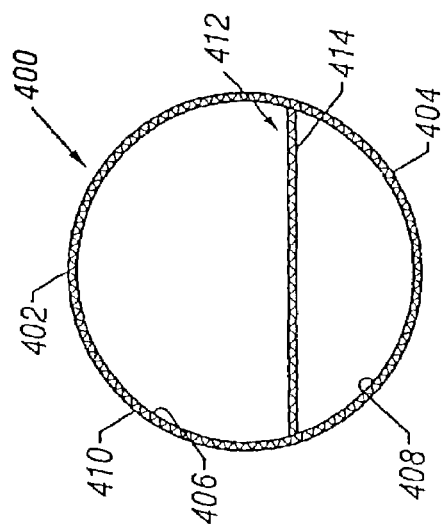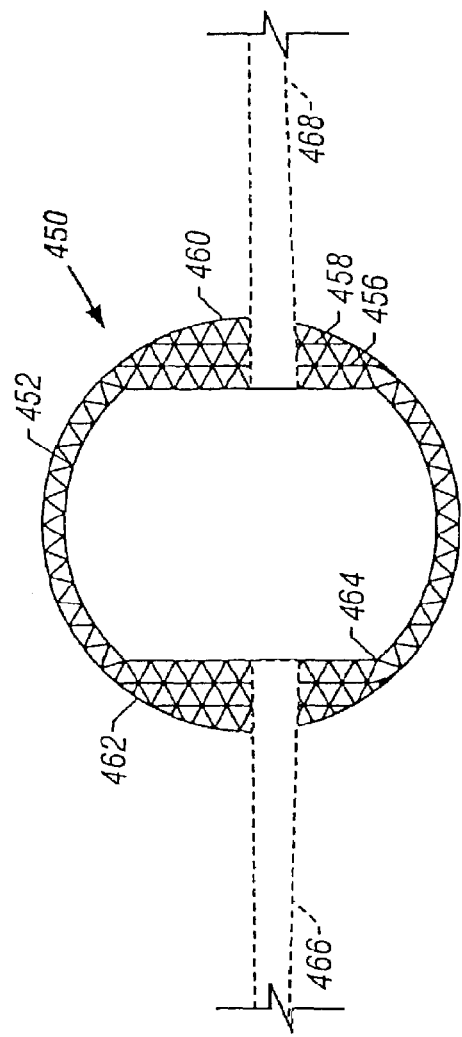

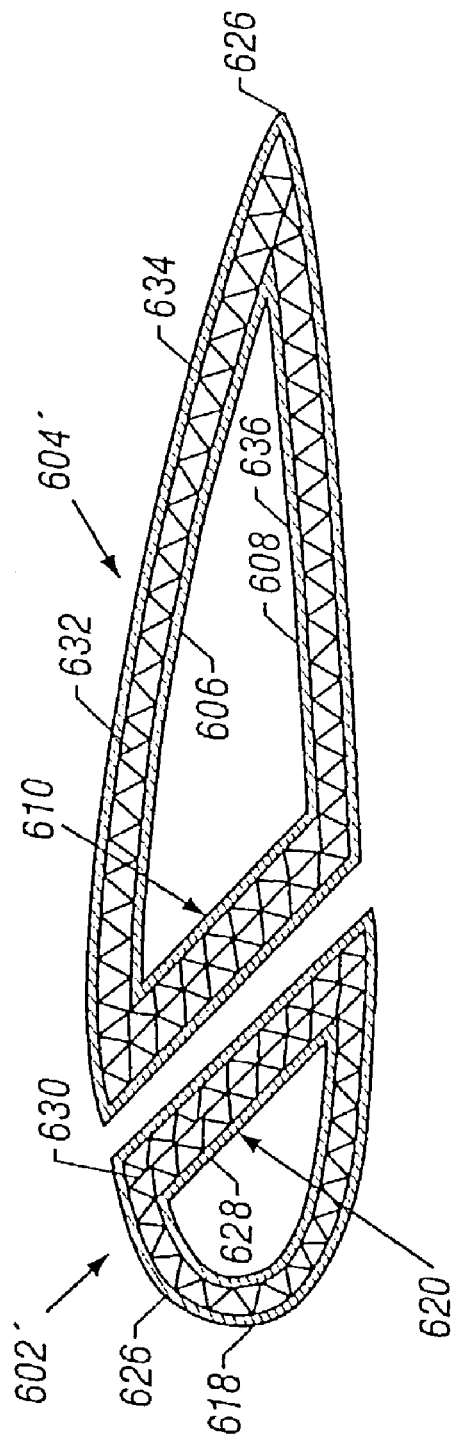
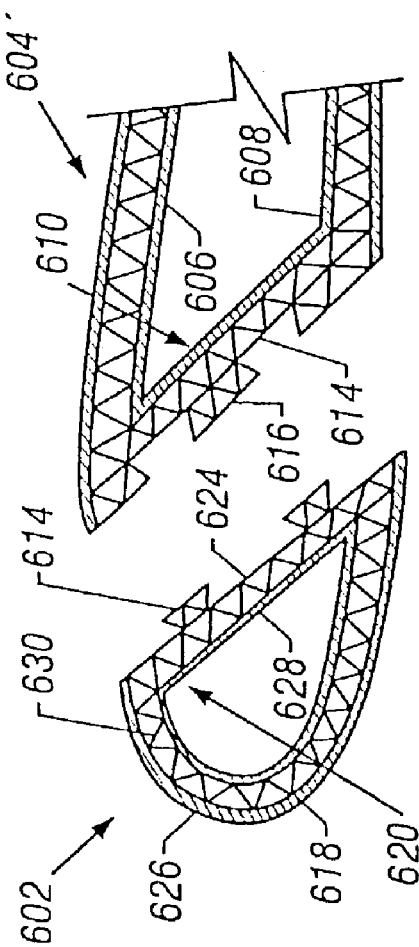
FIG. 34
FIG. 35

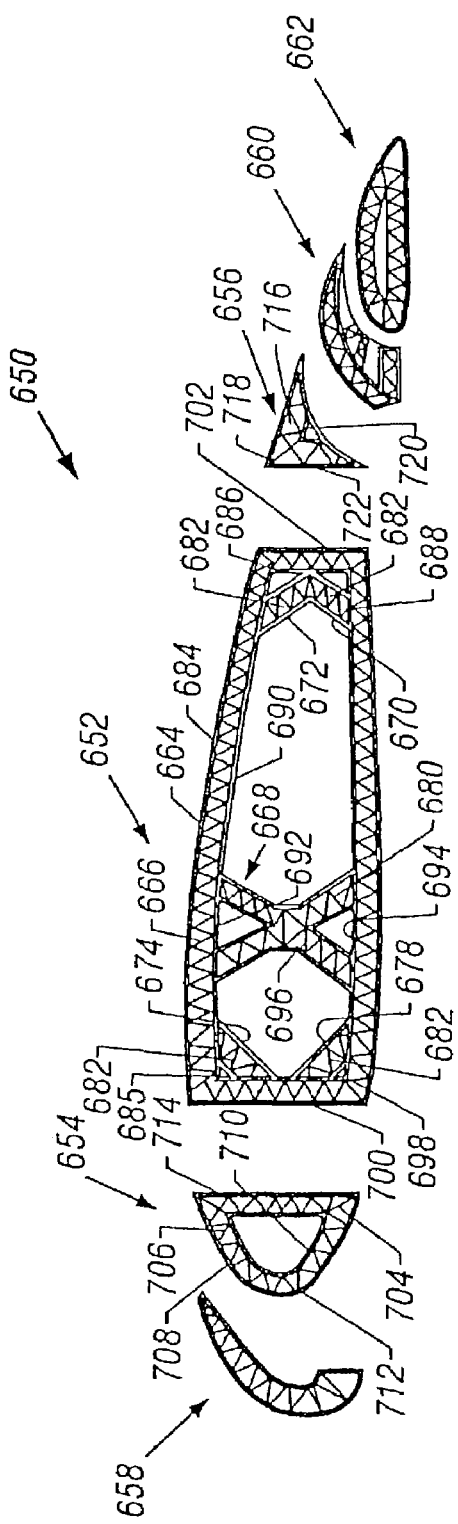
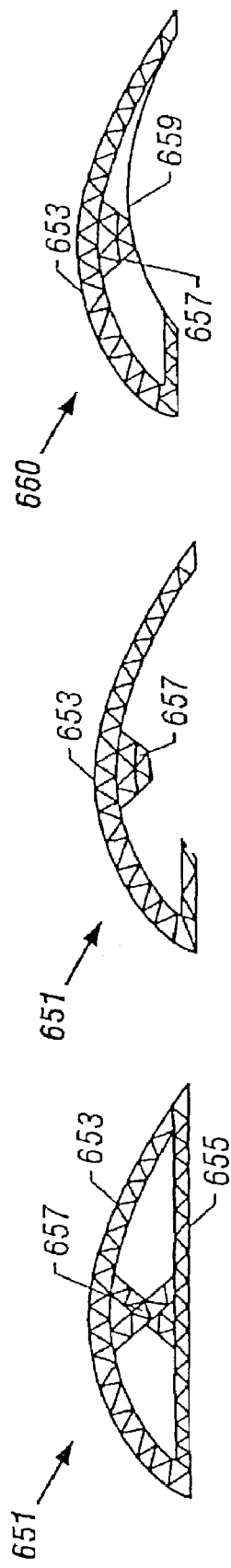
FIG. 36A
FIG. 36B
FIG. 36C
FIG. 36D

TUBULAR MEMBERS INTEGRATED TO FORM A STRUCTURE

RELATED APPLICATIONS

This application is a divisional application of U.S. Pat. application Ser. No. 09/489,041, filed Jan. 21, 2000, now U.S. Pat. No. 6,655,633, which is hereby incorporated by reference.

BACKGROUND OF THE INVENTION

1. Field of the Invention

This invention relates generally to a load carrying tubular member and, more particularly to a tubular member that has been wound with specific cross-section fibers in a controlled orientation to optimally carry the load applied to the member, where a number of load carrying members can be assembled to cooperate in forming a body of revolution.

2. Description of the Prior Art

Over the past two decades, the use of fiber composite materials in aircraft structures has gained popularity. As a result, modem airframes incorporate structural components made of composite materials to form aircraft wing structures, rotor blades, fuselage segments and the like as substantial weight savings can be achieved due to the superior strength-to-weight ratio of fiber composite materials as compared with the conventional materials of aircraft construction such as metal alloys. By replacing structural components previously formed of metal alloys with similar versions of the same component formed of composite material, a respective weight savings in the order of 25 to 30 percent is generally considered to be achievable.

In general, composites include a reinforcing material suspended in a "matrix" material that stabilizes the reinforcing material and bonds it to adjacent reinforcing materials.

Composite parts are usually molded, and may be cured at room conditions or at elevated temperature and pressurized for greater strength and quality.

Most of the composites used in aircraft structures comprise of filament reinforcing material embedded in a polymer matrix. A primary advantage associated with the use of filament composites is that their structural properties may be tailored to the expected loads in different directions. Contrary to metals which have the same material properties in all directions, filament composites are strongest in the direction the fibers are running. If a structural element such as a spar is to carry substantial load in only one direction, all the fibers can be oriented in that direction. This characteristic of filament composite provides for exceptional strength-to-weigh ratios and offers a tremendous weight savings opportunity to structural designers.

When fibers are aligned in only one direction, the resulting structure has maximum strength in that direction, and has little strength in other directions. Therefore, multiple layers or "plies" having fibers aligned in different directions with respect to one another are combined in a desired arrangement to provide combined strength along the principal axis as well as off-axis directions. As such, fibers oriented at 45° degree angles with the principle axis provide strength in two directions. For this reason, the 45° orientation is frequently used in structure that must resist torque. By utilizing permutations of this design philosophy to provide alternate plies of fibers at 0°, 45°, and 90° orientations the structural designer can obtain virtually any combination of tensile, compression, and shear strength in desired directions.

Common forms of fiber used in the production of composite structures include unidirectional tape, unidirectional fabric and bidirectional fabric. Unidirectional tape typically comes pre-impregnated with matrix material and is customarily provided on large rolls which can then be placed in a mold by hand or by robotic tape-laying machines. Similarly, bidirectional fabrics, having fibers running at 0 and 90 degrees, or unidirectional fabrics having fibers running in one direction may also be provided on large rolls pre-impregnated with matrix material. In another form of composite, individual filaments are wound around plugs or mandrels to form desired structural shapes. By way of background, the mandrels duplicate the inner skin of the structure or the inner surface of the structure. This technique is known as filament wound construction.

In addition to the form of fiber used in the production of composite structures, there are a number of fiber and matrix combinations which can be employed to provide desired structural properties of the resulting aircraft components. Fiberglass fiber embedded in an epoxy-resin matrix has been used for years for nonstructural components such as radomes and minor fairings. It is worthy of noting, however, that while fiberglass-epoxy has relatively good strength characteristics, its relatively low strength to weight ratio prevents its use in highly loaded structure. Additional material combinations which have eliminated this condition include: boron fibers used in combination with an epoxy matrix; aramid fibers (known as Kevlar) used in combination with an epoxy matrix, and graphite fibers used in combination with an epoxy matrix.

The United States military has been quick to incorporate fiber composite based structural components in its high-performance military aircraft. For example the F-16 utilizes graphite-epoxy composite material to form the horizontal and vertical tail skins. Similarly, graphite-epoxy composite material is utilized in the F/A-18 where such material forms the wing skins, the horizontal and vertical tail skins, the fuselage dorsal cover, the avionics bay door, the speed brake, and many of the control surfaces. The AV-8B employs composite materials even more extensively. In the AV-8B almost the entire wing, including the skin and substructure, is made of graphite-epoxy composite material with such material comprising approximately 26% of the total aircraft structural weight.

While composite materials have played an important role in reducing the overall structural weight of modem airframes, it should be noted that the basic design and layout of primary load carrying components contained within these structures has remained relatively the same. For example, a conventional aircraft wing structure consists of individual components such as spars, ribs, stringers and skin sections joined in combination to provide an integrated load carrying body which is capable of reacting to aerodynamic forces encountered during flight. As a result, individual spars, ribs, stringers and skin sections are specifically sized and oriented relative to one another so as to provide an optimized structural assembly designed to efficiently carry localized stresses generated by the combined effects of lift, drag, wind gusts, and acceleration loads which interact with surface of the wing or other airframe components.

In order to take advantage of weight savings opportunities afforded by the use of lighter weight materials, individual spars, ribs, stringers and skin sections previously formed from metal alloys have been replaced by similar components formed of fiber composite material. Frequently, these lighter weight components incorporate a "sandwich" style construction having two face sheets, or skins, made of fiber composite material which are bonded to and separated by a core. Typically, sandwich structures are formed with fiberglass-epoxy or graphite-epoxy skins which are bonded with adhesive to a phenolic honeycomb or rigid foam core wherein the skins carry tension and compression loads due to bending and the core carries shear loads as well as the compression loads perpendicular to the skins.

Unfortunately, manufacturing complexity and related labor cost associated with the assembly of numerous individual components, joined together to form an integrated load carrying structure, still remains. For example, conventional airframe construction techniques employ the use of elaborate jig fixtures designed to hold individual component parts in relative alignment during assembly to ensure proper component installation. In addition, drill templates are utilized to locate and drill fastener holes through mating pieces of structure to accommodate bolts or rivets used to mechanically join components together. These construction techniques are time consuming and require a great deal of dimensional precision because an improper installation of structural components may create a weakened resulting structure. Furthermore, the utilization of mechanical fasteners significantly contributes to overall structural weight. It is therefore generally desirable to minimize the number of mechanical joints in a structure in order to minimize both its weight and manufacturing cost while ensuring structural integrity. Integrally formed fiber composites structures have an important advantage over complicated structural assemblies in this respect, since large one-piece components are readily produced.

What has been needed and heretofore unavailable is a one-piece structure which is integrally formed as a unitary body and which is optimized to efficiently carry localized stresses developed from the complex interaction of static and aerodynamic forces encountered during all aspects of aircraft operation. The present invention satisfies these needs.

SUMMARY OF THE INVENTION

The present invention is directed to integrally stiffened load carrying structures comprising of a plurality of elongated thin-walled triangular tubes placed co-extensively in a complementary side-by-side fashion to form at least a portion of the wall of a hollow core having a desired external contour. Integral skins forming the external and internal surfaces of the core cooperate therewith to provide an integrally formed, unitary load carrying body of "sandwich" style construction.

Upon the application of external forces to the structure, adjacent triangular tubes forming the core cooperate to react loads about the perimeter of the structure. Similarly, adjacent tubes forming an internal support member cooperate to transfer loads from one side of the structure to the other. It will be appreciated that the present invention is capable of providing various load carrying cross-sections. Therefore, the cross-sectional geometry of the load carrying body can be specifically designed to provide a desired external contour which is capable of reacting expected external forces applied thereto.

This structure can be formed by, but is not limited to, extrusion, casting, diffusion bonding, the controlled deposition of material at the atomic level, and filament winding. With regard to the controlled deposition, a controlled deposition method such as Laser-assisted Chemical Vapor Deposition (LCVD) process may be used. Of course, other methods known to one of ordinarily skilled in the art may also be used.

By utilizing well-known filament winding techniques, the material properties of each tube can be specifically tailored to react localized stresses generated from the application of external forces upon the structure. In general, a triangular tube is formed with multiple layers or "plies" of composite material having fibers aligned in different directions. The plies of composite material are arranged with respect to one another to provide a structural element which is capable of reacting to forces in multiple directions. By utilizing alternate plies of fibers oriented at between 0° and 90° orientations relative to the longitudinal axis of the structure, each individual tube will be capable of reacting tensile, compression and shear stress from multiple directions. It will be appreciated that by tailoring the load carry capability of the individual tubes to suit the loads they are expected to encounter, a lightweight, efficient, load carrying structure may be produced.

It is also envisioned that the skins surrounding the internal and external surfaces of the shell and internal support member may be formed with filament wound fiber composite material. Like the construction of the individual triangular tubes discussed above, filament winding techniques may be utilized to tailor the load carrying properties of the skin. By providing layers of composite material having fibers running parallel to the longitudinal axis of the structure, skins suited for carrying localized stresses resulting from the application of longitudinal bending loads may be produced. Likewise, by incorporating layers of composite material having fibers oriented at between 0° and 90° to the longitudinal direction, the skins may also have the ability to react shear stresses resulting from torsional loading of the structure.

In order to design and fabricate integrally stiffened load carrying composite structures embodying the present invention, an estimation of the external forces which will be reacted by the proposed structure must be determined. This estimation requires a thorough understanding of the loading environment and operating conditions that the proposed design is expected to experience. Based upon these expected loading characteristics, the geometry of the proposed design can be used to resolve these forces and moments into resulting localized stresses. Individual structural components can then be appropriately sized and designed to efficiently carry these expected stresses.

Once the localized stresses are known, individual components which form the load carrying structure can be fabricated. The process of building up individual fiber reinforced skins and tubular elements is essentially a three-dimensional strengthening process. By utilizing filament winding techniques, fibers pre-impregnated with matrix material are wound under controlled tension to thereby precisely arrange multiple layers of fiber on a shaped mandrel surface.

From a structural design perspective, the tubular elements cooperating to form the load carrying shell are necessarily required to react stresses generated from more than one direction as resultant forces are applied to the structure from different directions. For example, a wing structure must be designed in such a way to efficiently react lifting forces and associated bending moments, frontal loads associated with aerodynamic drag and impulsive forces associated with wind gusts. Therefore, an important aspect of forming each individual tubular element is to orient the fibers along the mandrels in appropriate directions and proportions to form a composite structure having the desired mechanical properties suitable to carry anticipated localized stresses. While the winding process must produce the desired shape of each tubular element, in the ideal case, fibers will be aligned with the trajectories of principal stresses and will be concentrated in direct proportion to the local magnitude of stress.

After the individual triangular mandrels have been wound with an appropriate combination of fiber, they are placed together side-by-side in a geometrically complimentary fashion about appropriately shaped pre-wound mandrels to form the load carrying structure having a predetermined external contour. Additional fiber is then wound about the exterior of the assembly to provide a skin surrounding the exterior surface of the structure. The assembly is then placed into a mold having mold faces shaped to desired external contour of the structure. For most applications, this process eliminates the need for vacuum bagging and autoclaves. Temperature and pressure are employed by the mold to cure the composite, thereby bonding the skins and triangular tubes together. After the structure has cured, the individual mandrels are removed from the structure to provide an integrally formed, unitary load carrying body.

It will be appreciated that, by way of example and not of limitation, the present invention is capable of providing integrally stiffened aircraft wing structures, rotor blades, fuselage segments and the like, having a reinforced load carrying shell formed integral to an underlying support member, such as an X-shaped spar or strut. The skin, reinforced, shell and underlying internal support member thereby cooperate to carry static and aerodynamic forces encountered all aspects of aircraft operation. As a result of this novel method of construction, the need for individual stringers, ribs, spars, and skin sections typically used in combination to form conventional aircraft structures is eliminated.

Other features and advantages of the present invention will become more apparent from the following detailed description of the invention, when taken in conjunction with the accompanying exemplary drawings.

BRIEF DESCRIPTION OF THE DRAWINGS

FIG. 25 is an enlarged cross-sectional view taken along line 25—25 in FIG. 24;

FIG. 26 is a transverse sectional view of a fourth embodiment of the filament wound load carrying structure of the present invention in the form of an aircraft fuselage structure;

FIG. 27A is a cross-sectional view of a fifth embodiment of the filament wound load carrying structure of the present invention;

FIG. 34 is a cross-sectional view of tooling blanks utilized to make the wing shown in FIG. 33;

FIG. 35 is a partial exploded cross-sectional view, of the finished wing shown in FIG. 33; and FIG. 36A is an exploded cross-sectional view of an eighth embodiment of the filament wound load carrying structure of the present invention;

FIG. 36B is an exploded cross-sectional view of an sandwich structure ready to formed into an exemplary flange;

FIG. 36C is an exploded cross-sectional view of an sandwich structure with the base removed;

FIG. 36D is an exploded cross-sectional view of an exemplary flange;

DETAILED DESCRIPTION OF THE PREFERRED EMBODIMENTS

This description is not to be taken in a limiting sense, but is made merely for the purpose of illustrating the general principles of the invention. The section titles and overall organization of the present detailed description are for the purpose of convenience only and are not intended to limit the present invention.

One of the objectives of the present invention is to reduce the weight of a load carrying structure and at the same time reduce the cost of producing the structure. To accomplish the above objective, as in any structural design, the structure may be divided into elements and analyzed by such methods as finite element analysis to determine the load that must be carried by each of the elements. As such, each element may have its own unique load carrying characteristics, that is one element may be subject to more torque stresses than others, while another element may be subject to more tensile stresses. Thus, each element is specifically designed to handle its particular load, so that the combined elements can handle the overall load of the structure. To reduce the weight in constructing the structure, the present invention uses a tubular member with fibers wound in controlled orientation to specifically handle the load for that element. There is reduction is weight because strength to weight ratio of fibers is higher than that of traditional construction materials, such as steel or aluminum. To further optimize the strength to weight ratio of the structure, each layer of fiber is laid in a controlled orientation paralleling the direction of the load, as fibers' strength comes from resisting tensile loads. A further method to optimize the strength to weight of structure is to use specific fiber cross-sections that reduce matrix volume. Accordingly, when the individual triangular members are assembled to form the structure, it can handle the load yet light in weight.

Figure 1:
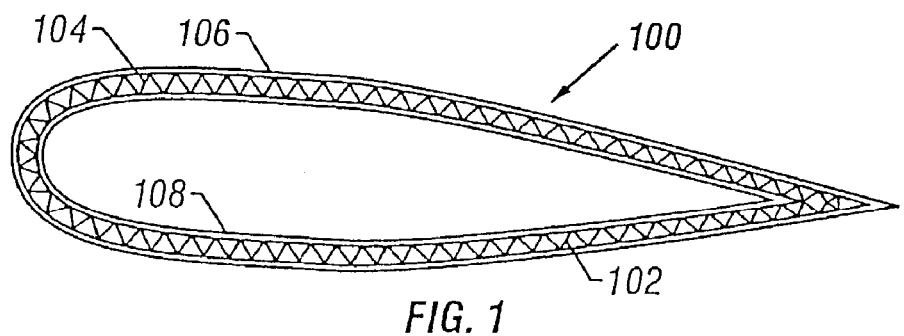
FIG. 1 is a cross-sectional view of a filament wound load carrying structure in the form of a composite aircraft wing embodying the present invention.

As illustrated by way of example in FIG. 1, the present invention includes an integrally formed composite aircraft wing structure 100 comprising a plurality of elongated thin-walled triangular tubes 102 placed co-extensively in complementary side-by-side fashion to form a body of revolution and bonded together to form a hollow core 104 having a desired external contour. Outer skin 106 and inner skin 108 are bonded to the external and internal surfaces of core 104 and cooperate therewith to provide an integrally formed, unitary load carrying body of "sandwich" style construction.

Figure 2:
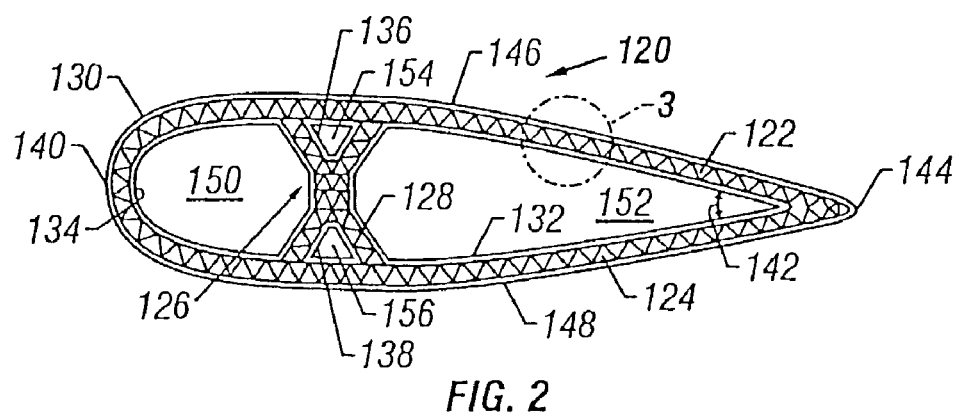
FIG. 2 is a cross-sectional view of a second embodiment of the filament wound load carrying structure of the present invention in the form of an aircraft wing having a predetermined exterior cross-section defined by a load carrying shell which is formed integral to an internal support member.

As further illustrated by way of example in FIG. 2, the another embodiment of the present invention includes an integrally formed composite aircraft wing structure 120 comprising of a plurality of elongated thin-walled triangular tubes 122 placed co-extensively in a complimentary side-by-side fashion and bonded together to form a hollow core 124 having a desired external contour. The core 124 is integrally formed with an internal support member 126 having an X shape in transverse cross section and spanning across the hollow interior of the wing structure 120 thereby connecting opposite sides of the shell together. The legs of such support member 126 are formed with a plurality of juxtaposed elongated thin-walled triangular tubes 128 bonded together and arranged to form, for example, a generally X-shaped spar or strut, extending the length of wing structure 120. Outer skin 130 and inner skins 132, 134, 136, 138 are bonded to the external and internal surfaces of core 124 and cooperate therewith to provide an integrally formed, unitary load carrying body of "sandwich" style construction. In this configuration the core 124, support member 126 and surrounding skins 130, 132, 134, 136, 138 cooperate to provide an integrated load path which extends the length of the wing structure and which is capable of reacting localized tension, compression, and shear stresses resulting from the application of external forces upon the structure.

Referring to FIG. 2, the individual triangular tubes 122 forming the core 124 cooperate to define at least a portion of a body of revolution having a desired curved or compound external contour. As such, the cross-section of wing structure 120 generally forms an airfoil shape having a rounded leading edge 140 which gradually tapers to provide an acute angle 142 terminating at trailing edge 144. The airfoil cross-section also includes upper surface 146 and lower surface 148 which are specifically designed to provide the desired lifting characteristics of the wing structure 120.

Upon the application of external forces to the wing structure, adjacent triangular tubes 122 forming the core 124 cooperate to react loads about the perimeter of the wing structure 120. Similarly, adjacent triangular tubes 128 forming the internal support member 126 cooperate to transfer loads between the upper surface 146 and lower surface 148 of the wing structure 120. For example, the internal support member 126 keeps the upper and lower surfaces 146, 148 from translating relative to each other due to bending moments on the wing structure 120. It will be appreciated that the present invention is capable of providing various load carrying cross-sections. Therefore, the cross-sectional geometry of the load carrying body can be specifically designed to provide a desired external contour which is capable of reacting expected external forces applied thereto.

The internal support member 126 extends the length of the structure core 124, wherein adjoining surfaces of the support member cooperate with the interior surface of the shell to define passageways 150, 152, 154, 156 therebetween. The internal support member may be configured to, for example, have generally X-shaped, V-shaped, or W-shaped cross-section to provide an efficient load path between upper surface 146 and lower surface 148. Upon the application of external forces to the wing structure 120, the cross-sectional shape of the support member provides chordwise shear resistance to core 124. Furthermore, because support member 126 extends the longitudinal length of the shell, shear forces resulting from vertical bending moments are reacted along its length, thereby transferring load between upper surface 146 and lower surface 148.

It will also be appreciated that additional internal support members may be added at various locations along the cross-section. Those skilled in the art will appreciate that the shape, location and number of internal support members will be influenced by the load carrying requirement of the wing structure. Therefore, by altering the cross-sectional geometry of the integrally formed shell and support member, wing structures having different load carrying characteristics can be produced.

In the illustrated embodiment of the present invention the structural core 124, internal support member 126, outer skin 130, and inner skins 132, 134, 136, 138, are constructed entirely from filament wound fiber composite material. As a result, upon co-curing the composite material, these structural elements become bonded together and cooperate to provide an integrally formed one-piece monoque wing structure which is capable of carrying aerodynamic loads encountered during flight.

Figure 3:
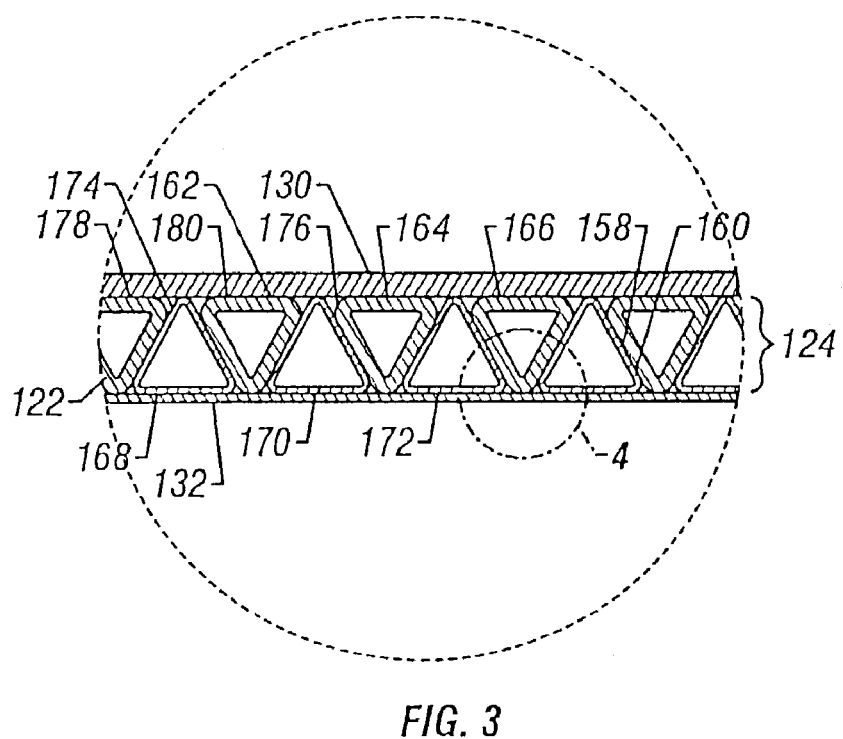
FIG. 3 is an enlarged cross-sectional view taken from the circle 3 in FIG. 2.

Referring to FIGS. 2 and 3, the individual triangular tubes 122, 128 forming the load carrying core 124 and internal support member 126 are constructed of filament wound fiber composite material. By utilizing filament winding techniques the material properties of each tube are specifically tailored to react localized stresses generated from the application of external forces upon the structure. In general, each triangular tube is formed with multiple layers or "plies" of composite material having fibers aligned in controlled orientation so that each layer may be laid in different direction than other layers. That is, the plies are arranged with respect to one another to provide a structural element which is capable of reacting forces in multiple directions. By utilizing alternate plies of fibers oriented at 0° to 90° orientations relative to the longitudinal axis of the structure, each individual tube will be capable of reacting tensile, compression and shear stresses from multiple directions. It will be appreciated that by tailoring the load carrying capability of the individual triangular tubes to the loads they are expected to encounter, a lightweight, efficient, load carrying structure is produced.

Referring to FIG. 3, in the illustrated embodiment of the present invention, thin-walled hollow tubes 122 forming the core 124 have triangular cross-sections positioned next to one another in an alternating inverted fashion. While triangular cross-sections are generally preferred for their isometric load carrying properties, other geometric cross-sections may be used. By way of example, and not of limitation, hollow tubes having isosceles triangular, equilateral triangular, or trapezoidal cross-sections may also be utilized.

With continued reference to FIG. 3, the hollow triangular tubes 122 forming core 124 are positioned adjacent to one another in an alternating inverted relationship wherein angled surfaces 158, 160 of adjacent tubes are bonded together. When bonded together, the angled surfaces of adjacent tubes cooperate to provide truss-like load carrying members which connect outer skin 130 and inner skins 132 together.

The bases 162, 164, 166 of alternate ones of the triangular tubes 122 cooperate to define the external surface of core 124. These bases will have a convex shape in cross-section such that they will confirm to a segment of the profile of the airfoil. Similarly, the bases 168, 170, 172 of the respective other alternate ones of the triangular tubes 122 cooperate to define the internal surface of the core 124. These bases will have flat surfaces such that they nest on the longitudinal facets of the inner skin mandrel. It will be appreciated that substantially continuous nature of the external and internal surfaces of the core facilitates bonding surrounding skins to the core. When bonded together, the bases of individual triangular tubes reinforce outer and inner skins, thereby permitting the transfer of localized stresses between the respective skins and the shell.

Because adjacent triangular tubes cooperate with one another and with the surrounding skin to carry loads throughout the structure, the cross-sectional thickness of adjacent tubes may be varied to provide an desired efficient load carrying capability. In an effort to reduce structural weight, the illustrated embodiment incorporates a repetitive pattern of alternative tubes having different cross-sectional thickness. As illustrated in FIG. 3, triangular tubes having thinner cross-sections 174, 176 are disposed between adjacent tubes having thicker cross-sections 178, 180.

Based upon the fundamentals of structural analysis, internal stresses due to bending loads are highest at the cross-sectional extremities of a structure. This stems from the fact that bending stresses within a structural cross-section vary with distance from the neutral axis. As such, cross-sectional locations which are farther from the neutral axis experience higher bending stress than cross-sectional locations at or near the neutral axis.

Referring to FIGS. 2 and 3, in relation to the cross-section of the wing structure 120, the highest bending stresses are carried by the outer skin 130 and adjoining bases of triangular tubes 162, 164, 166. Thus, it will be appreciated that the bases of thicker tubes 178, 180 are joined to the outer skin 130 to provide additional load carrying capability about the cross-sectional extremity of wing structure 120. At locations closer to the neutral axis, bending stresses decrease linearly until becoming zero at the neutral axis. Accordingly, because inner skins 132, 134, 136, 138 are located closer to the neutral axis than outer skin 130, the respective bending stresses carried therein are lower than those carried by the outer skin. Therefore, the cross-sections of inner skins 132, 134, 136, 138 are thinner than the cross-section outer skin 130. In addition, bases 168, 170, 172 of the triangular tubes which are joined to the inner skins have thinner cross-sections than those joined to the outer skin.

The skins 130, 132, 134, 136, 138 surrounding the internal and external surfaces of the shell 124 and internal support member 126 are formed with fiber composite material. Like the construction of the individual triangular tubes discussed above, filament winding techniques are utilized to tailor the load carrying properties of the skin. As such, the skins are formed with multiple layers or "plies" of composite material having fibers aligned in controlled orientation so that each layer may be laid in different directions. The plies are arranged with respect to one another to react forces in multiple directions. For example, by providing layers of composite material having fibers running parallel to the longitudinal axis of the structure, the skins will be capable of carrying localized stresses resulting from the application of vertical bending loads created as lift is produced by the wing. Likewise, by incorporating layers of composite material having fibers oriented at 0° to 90° to the longitudinal direction, the skins will have the ability to react shear stresses resulting from torsional loading of the structure.

Those skilled in the art will appreciate that the composite materials utilized to form the present invention may include, but are not limited to, graphite, aramid, boron, or glass fibers embedded in an epoxy matrix. Metallic fibers may also be used in addition to a variety of other polymer or metallic based matrix materials. In general, the fibers function primarily to carry stresses generated in the composite material while the matrix functions to hold the fibers together, distribute the load between the fibers, and protect the fibers from the environment. Therefore, it will be apparent to those skilled in the art that cost, performance, and the material properties of the various material combinations will influence the selection of materials to be used in the design and fabrication of the present invention.

In choosing the appropriate fiber and matrix combination for the present invention, the functional characteristics of both the fiber and the matrix must be considered. For example, in an aircraft where aerodynamic heating is of concern, a matrix material which is suited to withstand elevated temperatures should be selected. Similarly, the load carrying requirements of the structure will greatly influence fiber selection. This is because the relative strength of fibers contained within the matrix determines the load carrying capability of the resulting structure. Therefore, graphite fibers, which have greater load carrying capability, may be utilized in heavily loaded primary structures while weaker fiberglass fibers may be utilized ancillary secondary structures.

To further strengthen the structure, a metal matrix can replace the organic matrix. For example, organic matrix can handle maximum stress level of between 5,000 PSI and 10,000 PSI. On the other hand, titanium aluminide has maximum stress level of about 150,000 PSI; while aluminum has maximum stress levels up to 90,000 PSI depending on the alloy. The fiber material, such as carbon fiber has maximum stress level of about 600,000 PSI to 1,000,000 PSI. Accordingly, with metal matrix, it is an area of strength rather than being a point of weakness like organic matrix.

Another advantage with metal matrix is its high melting temperature. For example, some fighter jets can fly over mach III (about 2,000 MPH), at that speed, the external surfaces of the jet may heat up to 600° F. However, some organic matrix have a plastic temperature of 400° F., i.e., temperature where the matrix is malleable, so that fibers will not hold in its place. On the other hand, aluminum has an approximate melting temperature of 1100° F., with approximate plastic temperature of 600° F. And titanium has an approximate melting temperature of 3,000° F. Accordingly, with metal matrix fighter jet can fly well over mach III without worrying about the metal matrix going plastic.

With regard to applying metal to the fibers, the metal can be plasma sprayed, chemical vapor deposited, or any other method know to one ordinarily skilled in the art. Furthermore, other metals known to one of ordinarily skilled in the art may be deposited onto the fiber. The plated fibers are then wound around the mandrel as discussed above. This can be done in either a vacuum or outside of the vacuum chamber, because of the oxidizing nature of metals such as titanium aluminide. Once the mandrel has been wound with the plated fibers, clamps may be used to hold all the tubes together. Thereafter, heat is applied such that the metal melts, causing the fibers to bond to the adjacent fibers. In other words, matrix material is now metal rather than organic material.

Additional considerations may also be given to non-structural characteristics of the respective materials. For example, metallic or carbon fibers embedded in a polymer matrix are known to have radar absorption characteristics which may be useful in military applications where stealth characteristic are important. Furthermore, because metallic fibers are capable of conducting electricity, they may be utilized to form a composite aircraft structure which has improved resistance to damage from lightning strikes. Likewise, conductive matrix materials may be utilized to provide a similar dissipative effect.

In regard to the radar absorption, the triangular tubes also help absorb and/or redirect the radar signals. That is, as the radar signal enter through one of the sides of the triangular walls, the radar signal than bounces off one of the adjacent wall and keeps bouncing off the three walls; and every time the radar signal hits a surface, a certain amount of energy of the radar signal is absorbed by the triangular tube, until most if not all of the energy of the radar signal is absorbed. With regard to the radar signals that are not absorbed, if any, they will bounce off the triangular tubes tangently and not necessarily deflect back to the radar receiver for detection. Off course, for commercial planes where radar detection is preferred, the plane may be metal plated to deflect the radar signal to the receiver. But for military planes where stealth characteristics is preferred, the combination of the metallic and/or carbon fibers embedded matrix and triangular tubes can absorb much of the radar signals to avoid detection.

It is also envisioned that optical fibers may be incorporated into the composite construction of the present invention to provide an active means for monitoring structural integrity. This is accomplished, for example, by incorporating a continuous length of fiber optic filament within a ply of composite forming a structural component of the wing structure. Light signals passing through the fiber optic filament are then monitored to detect signs of structural damage. When the structure is free from damage, the fiber optic filament remains intact thereby allowing a light signal to pass through its length from a source located at one end of the filament to a detector located at the other end. In the presence of structural damage, however, the fiber optic filament will become severed. As a result, the light signal will be interrupted and the detector will record the loss of the signal.

With regard to the fibers intermixed in the matrix, it will be appreciated that organic matrix material has little load-bearing capability, the material properties of the resulting composite will be limited in proportion to the fractional volume of fiber contained therein. Therefore, higher fiber densities are desired to increase the load carrying capability of the composite material. Conventional fibers, having circular cross-sections, even when tightly packed in relation to one another, leave interstitial spaces which are necessarily filled with matrix material. As a result, the typical composition of fiber composite material comprise of 60% fiber and 40% matrix.

Figure 37A:
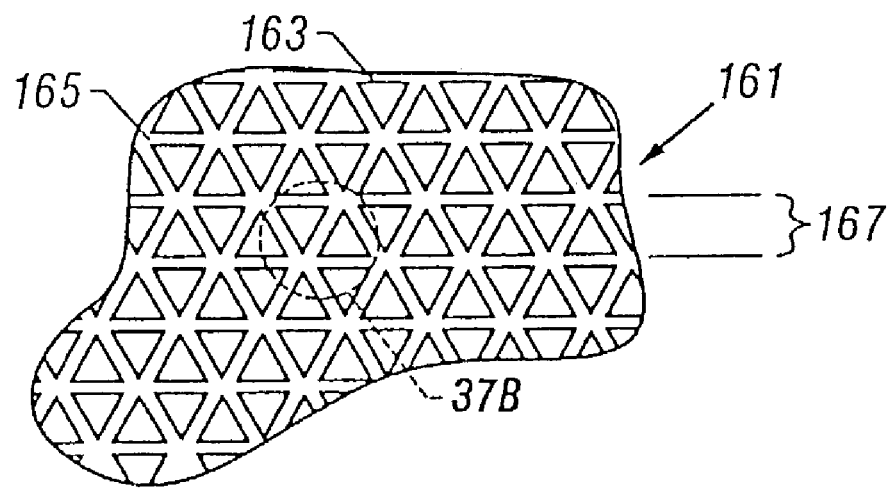
FIG. 37A is an exploded cross-sectional view of an exemplary triangular fibers intermixed within the matrix material.
Figure 37B:
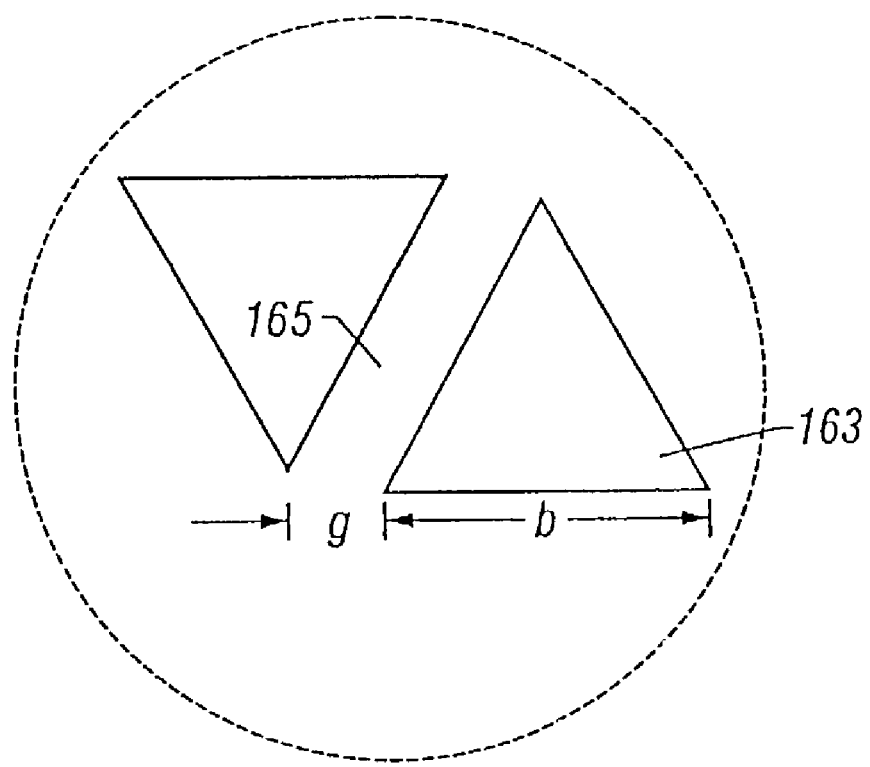
FIG. 37B is still further exploded cross-sectional view of an exemplary triangular fibers intermixed within the matrix material.

Accordingly, as illustrated by way of example in FIG. 37A, fibers having triangular cross-sections 163 or similar geometric shapes are utilized to improve the content of fibers versus the matrix material 165. As further illustrated in FIG. 37B, the exemplary triangular fibers 163 are placed together in a side by side relationship to minimize the interstitial spaces 165, where gap "g" is the distance between the two adjacent fibers, and "b" is the width of one of the sides of the triangle. As an example, to properly hold the fibers together, the gap "g" may be less than one-tenth (0.1) of width "b" of the fiber. In other words, less than one-tenth of width "b" is filled with matrix material to hold the adjacent fibers together. As a result, according to simple calculation, a combination of fibers and matrix 161 having up to 90% fiber fill and 10% matrix fill may be accomplished. In other words, instead of 60% fiber fill with circular cross-sectional fibers, a 90% fiber fill is possible with triangular cross-sectional fibers, or 30% (90%–60%) increase in strength versus circular fibers. Note that in general, for same cubic volume of fibers and matrix, they both weigh about the same, so there would be a true increase in strength without the increase in weight. This translates into about 30% weight saving in the structure by using the triangular cross-sectional fibers. Of course, the trade off between strength to weight ratio will vary depending on the type of fiber and matrix used.

The placement of triangular fibers in a controlled pattern will be accomplished using microscopic placement of each individual fiber. Alternatively, square or rectangular cross-sectional fibers may also used to increase the fill percentage of the fiber versus the matrix material. For example, the square or rectangular fibers may be microscopically placed like laying bricks with matrix materials in between.

Figure 4:
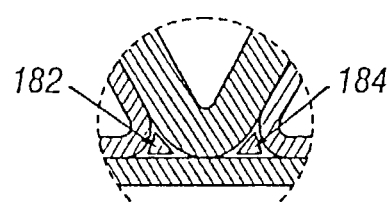
FIG. 4 is an enlarged cross-sectional view taken from the circle 4 in FIG. 3.

It will also be appreciated that spaces between adjoining load carrying components within a composite structure should be avoided. As shown in FIGS. 3 and 4, spaces created between adjacent triangular tubes 122 forming the core 124 are filled with rods 182, 184. The rods extend the length of the structure and have cross-sectional shapes which compliment the spaces created by the adjoining apexes of adjacent triangular tubes. Preferably the rods may be metallic or formed from material having a load carrying capability which is similar to that of the fibers contained within the adjoining composite. Thus upon co-curing the composite, the rods 182, 184 cooperate with the adjacent tubes and the skin to provide a continuous load bearing structure.

Those skilled in the art will appreciate that the method for constructing a filament wound composite aircraft wing embodying the present invention begins with an initial analysis of a conceptual design bearing the basic geometric configuration of the wing. Before the actual structural members can be sized and analyzed, the loads that the wing will sustain must be determined.

The process of estimating aircraft loads includes a consideration of the combined effects of aerodynamic, structural component interaction, and relative weight distribution of structural components. This analysis is commonly accomplished with the help of finite-element methods in addition to more classical sizing approximations employed by modern structural designers.

The development of expected aircraft loads includes an analysis of typical critical loads experienced during all aspects of aircraft operation. Air loads, for example, are developed from in-flight maneuvering, wind gusts, control deflections, structural component interaction and buffet. Similarly, inertia loads are developed from aircraft acceleration, rotation, vibration, flutter and other dynamic responses to force perturbations encountered during operation. Structural loading is also induced by the power plant wherein thrust, torque, and vibration generate loads which impinge upon associated aircraft structure. Other loads to be considered include those encountered during aircraft taxi, landing, and takeoff. These regions of operation produce localized loads associated with bumps, turns, braking, and vertical accelerations generated from aircraft touchdown. Additional structural accommodations must also be made for less frequent events such as aircraft towing, bird strikes, and jacking associated with maintenance procedures.

Based upon the various external forces which interact with the wing structure, individual components contained therein must be capable of reacting a combination of tension, compression, and shear. For example, a bending force due to a lifting load at the end of the wing produces a combination of tension and compression. The upper surface of the wing structure experiences compression while the lower surface of the wing experiences tension. In addition, torsion produced from a moment which tends to twist the wing produces tangential shear forces in the structure.

Once the design loads for the aircraft wing structure have been developed, individual load carrying components such as the triangular tubes and skin can be appropriately designed and sized to carry the expected load. In general, structural members respond to a load by deforming in some fashion until the structure is pushing back with a force equal to the external load. Once the expected external forces are known, the structural designer can tailor structural geometry and material properties to resolve these forces into the internal localized stresses produced in response to the external load in a manner to provide a lightweight, efficient load carrying structure.

In light of the various forces effecting a wing structure, the creation of appropriately designed and sized structural components becomes an important aspect of the present invention. Therefore, the process of building up individual fiber reinforced triangular tubes 122, 128 and respective skins 130, 132, 134, 136, 138 is essentially a three-dimensional strengthening process. From a structural design perspective, the triangular tubes and surrounding skins, which cooperate to form the load carrying monoque body, are necessarily required to react stresses generated from more than one direction as resultant aerodynamic forces are applied to the aircraft structure during flight. For example, a wing section must be designed in such a way to efficiently react lifting forces and associated bending moments, frontal loads associated with aerodynamic drag and impulsive forces associated with wind gusts. Therefore, an important aspect of forming the triangular tubes and respective skins is to orient the fibers along the mandrels in appropriate directions and proportions to obtain composite material having the desired mechanical properties suitable to carry anticipated localized stresses. While the winding process must produce the desired shape of structural component, in the ideal case, fibers will be aligned with the trajectories of principal stress and will be concentrated in direct proportion to the local magnitude of stress.

Figure 5:
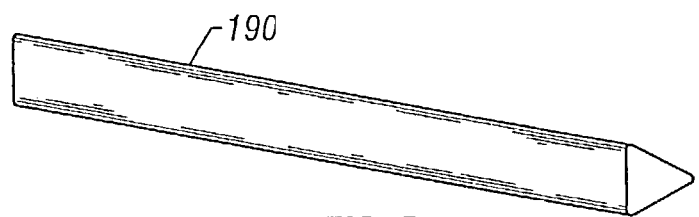
FIG. 5 is a perspective view, in enlarged scale, showing a triangular mandrel incorporated in the wing shown in FIG. 1.

Referring to FIG. 5 the fabrication of each load bearing triangular tubes 122, 128 comprise of winding pre-impregnated fibers about an appropriately sized elongated mandrel 190 having a triangular shaped transverse cross-section. The triangular mandrel 190 is constructed of one piece steel or aluminum if withdrawal is possible. For example, mandrel may be withdrawn, when the mandrel is used to form a tapered structure, such as a wing structure, much like withdrawing a knife from its housing. The withdrawable mandrel of course may be reused. Where simple withdrawal is not possible various types of removable mandrels may be employed, including those made of low-melting point metal or soluble plastic. Inflatable and collapsible mandrels may also be used.

As discussed in greater detail below, during the winding process, a continuous length of filament is deposited under controlled tension about the exterior surface of the mandrel 190 to form a layer of composite. The continuous filament is wound about the mandrel 190 in a desired orientation with respect to the longitudinal axis of the mandrel to establish a layer of composite having parallel fibers running in a predetermined direction. As such, a continuous filament is wound circumferentially, longitudinally or helically about the mandrel to deposit complimentary fibers in a side-by-side fashion to provide a layer of composite material having fibers aligned in a desired orientation.

It will be appreciated that by winding a filament circumferentially about the surface of the mandrel 190, a continuous layer of composite material having parallel fibers running at a 90° orientation to the longitudinal axis thereof may be formed. Similarly, a continuous filament that is wound longitudinally about the surface of the mandrel will establish parallel-fibers running at a 0° orientation to the longitudinal axis. It will also be appreciated that by winding a continuous filament in a helical pattern about the surface of the mandrel, a layer of composite material having various fiber orientations ranging between 0° and 90° with respect to the longitudinal axis may be formed.

Due to the complex interaction of aerodynamic forces upon the wing structure, individual load carrying tubes must be capable of reacting loads from multiple directions. Therefore, multiple layers of composite material having fibers aligned at various orientations are formed onto the surface of the mandrel to provide a composite cross-section which is capable of reacting to forces from multiple directions. Each individual load bearing tube is formed with a combination of layers which will carry multi-directional tension, compression and shearing stresses. For example, a first layer of fiber material is deposited onto a mandrel by winding a continuous fiber circumferentially about the exterior surface thereof. Thereafter, a second layer of composite material is deposited about the first layer having consecutive fibers running parallel to the longitudinal axis. A third layer, deposited about the second layer, contains fibers aligned at a 30° orientation to the longitudinal axis. Likewise, additional layers of composite having various fiber orientations are applied to form a desired arrangement of composite layers forming the tubular cross-section. The individual plies are then bonded together during the curing process to form a structural entity.

Because the magnitude and direction of the loads throughout the structure vary with location along the wing, the material properties of each triangular tube are specifically designed to accommodate expected localized stresses. Therefore, based upon its location and expected load, each triangular tube is formed with a combination of layers or "plies" of composite material having fibers aligned in predetermined directions to provide material properties suited to carry the expected load. This is accomplished by forming multiple layers of composite material about the surface of the mandrel to provide a composite cross-section having fibers arranged in direct proportion to the magnitude and direction of the expected loads. For example, where high bending loads are expected, triangular tubes are constructed with a greater proportion of layers having fibers running parallel to the longitudinal axis of the mandrel. Similarly, where high torsional loads are expected, triangular tubes are constructed with a greater proportion of layers having fibers oriented at an angle relative to the longitudinal axis.

Based upon the magnitude of expected loads along the longitudinal span of the wing, the cross-sectional thickness of an individual triangular tube may be altered at various locations along its length to provide an efficient load carrying element. In localized areas of highly concentrated loads, a thicker tubular cross-section is formed by winding additional layers of appropriately oriented fibers about the respective mandrel. Similarly, in areas of minimal loading, a thinner composite cross-section is formed with fewer layers of composite wound about the respective region of the mandrel. Therefore, the cross-sectional thickness of each triangular tube is varied along its longitudinal length in direct proportion to the magnitude of the localized loads.

Figure 6:
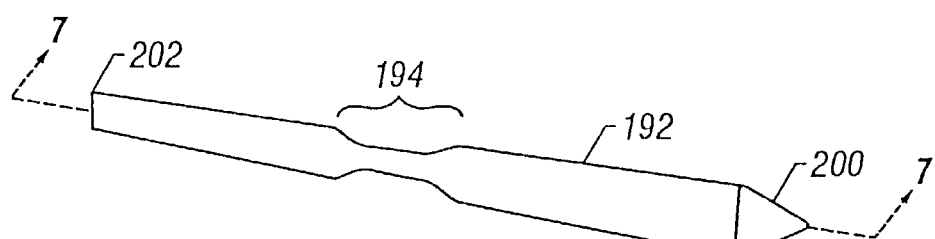
FIG. 6 is a perspective view, in enlarged scale, showing a triangular mandrel incorporated in FIG. 1 to provide a composite tube of varying thickness.
Figure 7:
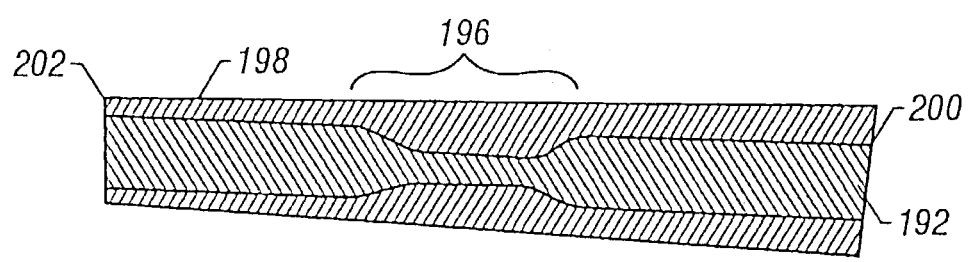
FIG. 7 is an enlarged cross-sectional view taken along line 7—7 of FIG. 6.

As shown in FIGS. 6 and 7, in order to fabricate a composite tube having regions of greater cross-sectional thickness, the local external dimensions 194 of the respective mandrel 192 are adjusted. Where regions of thicker composite cross-sections are desired, the exterior dimensions of the mandrel 194 are reduced to permit additional layers of fiber composite material 196 to be deposited about the exterior surface of the mandrel. This technique permits the fabrication of thicker cross-sections at certain locations along the longitudinal length of the tube while maintaining a continuous exterior surface 198 of the tube.

In general, vertical lifting forces distributed along the longitudinal span of the wing produce vertical shear and bending moments of increasing magnitude. Due to the cantilevered configuration of a wing structure, the greatest bending loads occur at the wing root. As a result, the cross-sectional thickness of each individual load bearing tube is greater at the wing root end 200 than at the wing tip end 202. The gradual increase in cross-sectional thickness is formed by winding fibers from the root end 200 to the wing tip end 202. Initially, several layers of fiber are deposited along the entire length of the mandrel 192 to establish a smooth and continuous surface. Thereinafter, each additional layer of fiber is terminated prior to reaching the end of the layer below. Thus, a gradual stair-step configuration is created wherein consecutive layers of fiber cooperate to provide a smooth transition from a relatively thin cross-section at the wing tip end 202 to a thicker cross-section at the root end 200.

Figure 8:
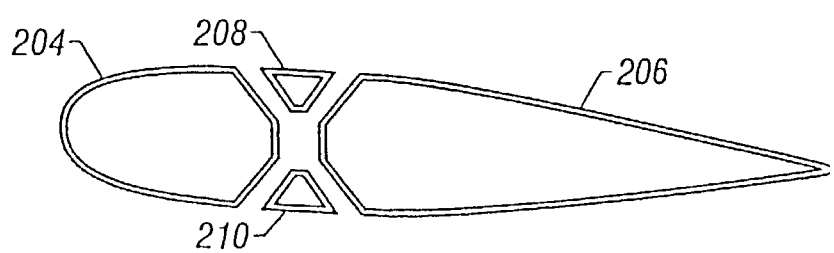
FIG. 8 is an exploded transverse cross-sectional view of core mandrels incorporated in the wing shown in FIG. 2.

Referring to FIG. 8, inner skin mandrels 204, 206, 208, 210 establish the general shape and contour of the illustrated embodiment of the present invention. The inner skin mandrels are wound with multiple layers of composite material to form inner skins 132, 134, 136, 138 respectively. In addition, the inner mandrels cooperate with one another to guide the placement and alignment of individual triangular tubes 122, 128 disposed thereabout, thereby forming the core 124. This is accomplished generally in the form of longitudinal facets on surfaces that follow the shape of the airfoil.

Like the triangular mandrels 190 mentioned above (FIG. 5), the inner skin mandrels 204, 206, 208, 210 are constructed integrally of steel or aluminum if withdrawal is possible. Where simple withdrawal is not possible, various types of removable mandrels may be employed, including those made of low-melting point metal or soluble plastic. Inflatable and collapsible mandrels may also be used.

Figure 9:
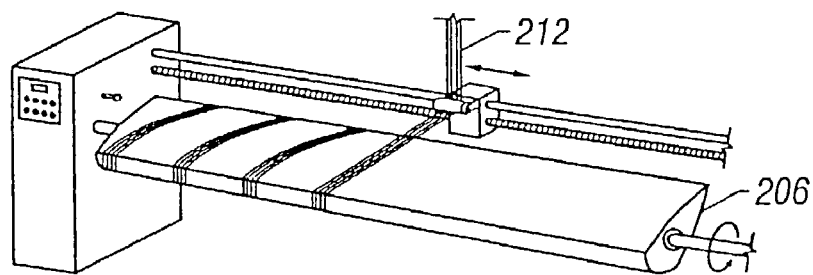
FIG. 9 is a perspective view, in reduced scale, of a core mandrel as shown in FIG. 8 being wound.
Figure 10:
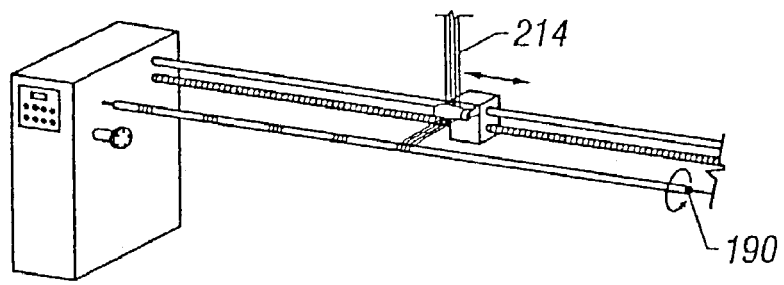
FIG. 10 is a perspective view, in reduced scale, similar to FIG. 9.

The process for constructing the preferred embodiment of the present invention begins with winding filament about the respective mandrels to form the desired structural components. Referring to FIGS. 9 and 10, an inner skin mandrel 206 is loaded onto a filament winding machine and fibers 212 pre-impregnated with matrix material are applied thereto to form the desired multi-layer composite construction for inner skin 132, having fibers oriented in predetermined directions. This process is repeated for the remaining inner skin mandrels 204, 208, 210, thereby forming the inner skins 134, 136, 138 respectively.

Once the inner skin mandrels have been covered with fiber composite material, individual triangular mandrels 190 are wrapped with fibers 214 pre-impregnated with matrix material to form the triangular tubes 122, 128. As previously mentioned, each triangular tube is formed with multiple layers of composite material having fibers aligned in predetermined directions. By depositing alternate layers of fibers aligned at 0° to 90° orientations relative to the longitudinal axis of the mandrel, each tube will be capable of reacting tensile, compression and shear stress from multiple directions.

Figure 11:
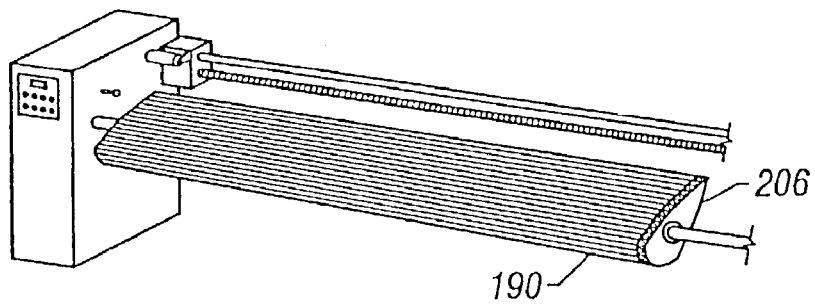
FIG. 11 is a perspective view of a core mandrel shown in FIG. 9 with fiber wound triangular mandrels placed about the exterior thereof to provide an assembly;.
Figure 12:
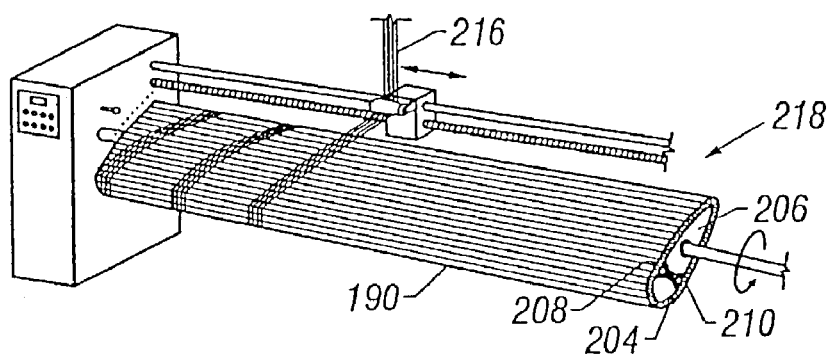
FIG. 12 is a perspective view of the assembly shown in FIG. 11 with the leading edge mandrel added.
Figure 13:
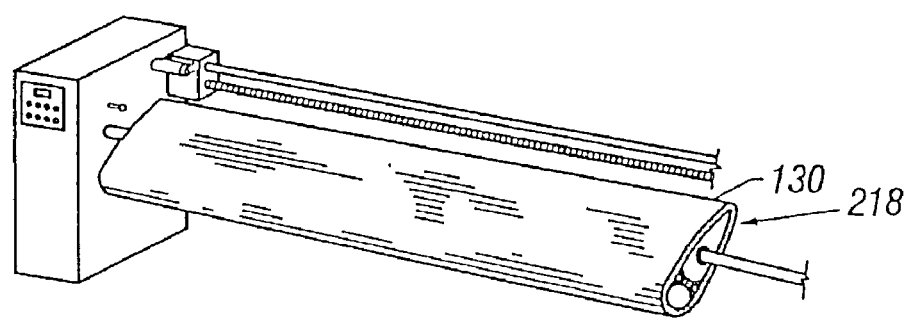
FIG. 13 is a perspective view of the assembly shown in FIG. 12 with an exterior skin added.

As shown in FIGS. 11, 12, and 13, fiber wound triangular mandrels 190 are then positioned in a complementary side-by-side relationship, each triangular mandrel placed in a predetermined position relative to the respective mandrel to handle the load in that position, co-extensive about the wound exterior surfaces of the inner skin mandrels 204, 206, 208, 210 to produce the desired exterior contour as shown in FIG. 12. The mandrels are clamped together to form an assembly 218 (FIG. 12) and fibers 216 pre-impregnated with matrix material are applied to the exterior surface of the assembly to form outer skin 130 disposed thereabout. Again, alternate layers of fibers aligned at 0° to 90° orientations relative to the longitudinal the assembly are deposited about the surface to provide a skin with desired material properties. Since the external skin will carry the greatest loads, it will, in all probability, have the most layers of windings.

As previously mentioned, the skins 130, 132, 134, 136, 138, core 124 and internal support member 126 cooperate to form an integrated load path which extends the length of the wing structure 120 and which is capable of reacting external forces applied thereto. Upon the application of external forces, the individual triangular tubes 122, 128 forming the core and internal support member act as beam elements wherein each tube is subjected to complex loading conditions which may include shear, bending, axial loads, and/or torsion. These combined loads are reacted by the directional fibers contained within the composite cross-section of each tube.

Ideally, loads are reacted by fibers aligned with the direction of the load. As such, fibers aligned with the load direction are placed in uniform tension or compression. It will be appreciated that adjacent triangular tubes are bonded together to form a truss-like network of load carrying structure which is disposed between the exterior and interior skins. Abutting sides of adjacent tubes cooperate to transfer loads from one tube to the next and between the respective skins. Therefore, tension and compression forces contained within the fibers of one triangular tube are transferred and distributed with fibers contained in adjacent triangular tubes. Abutting sides of tubes provide large surface area for bonding which result in reduction in local shear forces between structural elements.

In combination, the skins, core and internal support members provide an integrally formed wing structure which is designed to function as a cantilevered beam. It will be appreciated that the cross-sectional geometry of the wing structure provides a large area moment of inertia which is beneficial to minimizing bending stress created from the interaction of aerodynamic forces therewith. In other words, the loads on the structure are well distributed amongst the skins, core and internal support members, instead of being carried by rivets that hold the traditional aluminum constructed wing structure together, for example.

Figure 14:
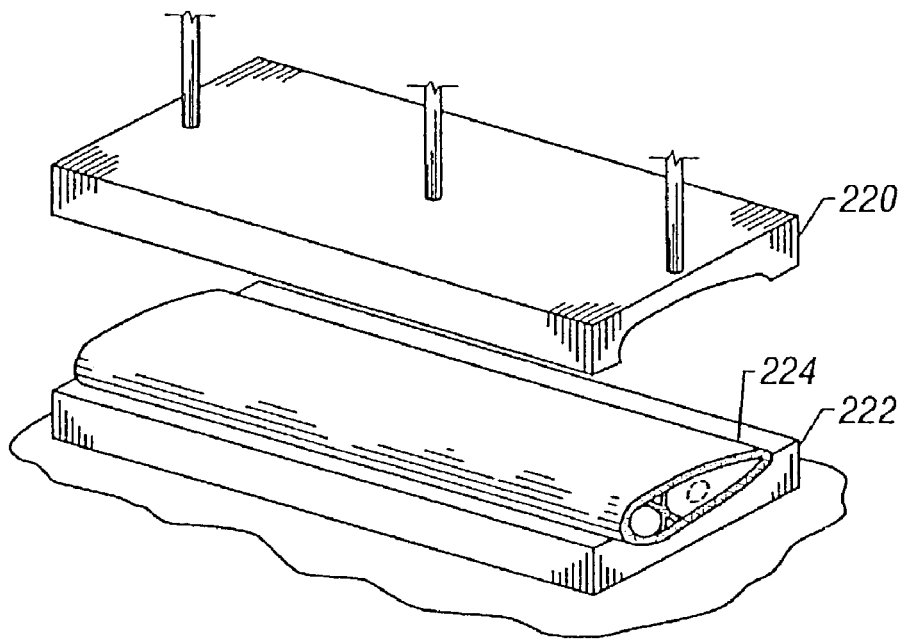
FIG. 14 is a perspective view of the assembly shown in FIG. 13 placed in an open female mold having a desired external contour.
Figure 15:
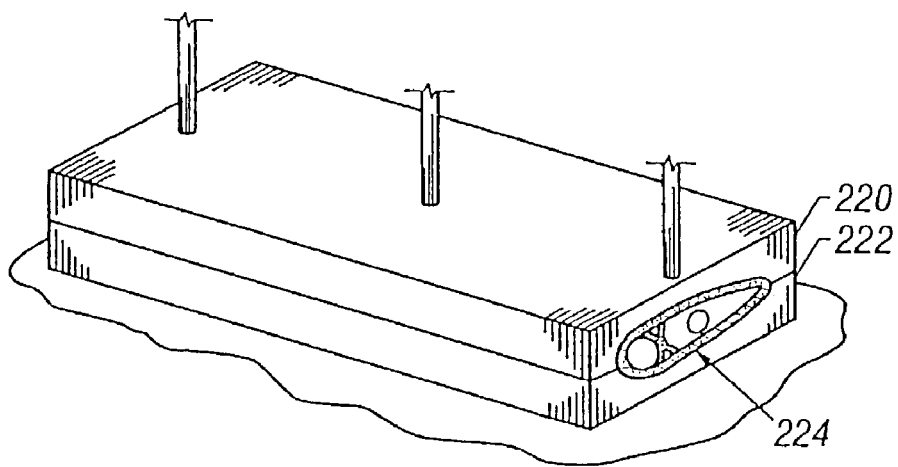
FIG. 15 is a perspective view of the mold shown in FIG. 14 but in its closed position for application of heat and pressure.
Figure 16:
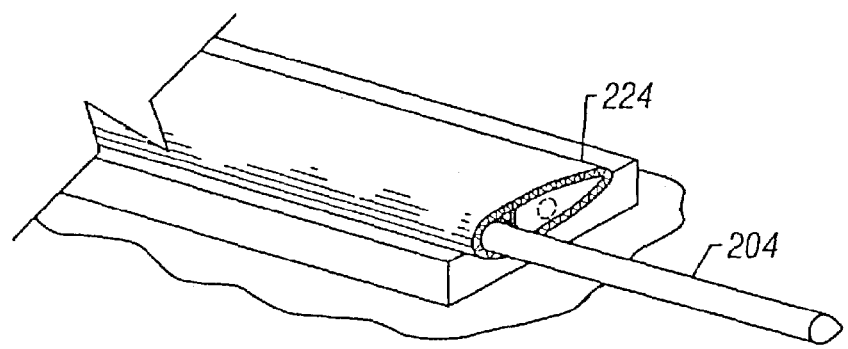
FIG. 16 is a perspective view, partially in section, similar to FIG. 15 but with the mold open and showing the removal of a mandrel.
Figure 17:
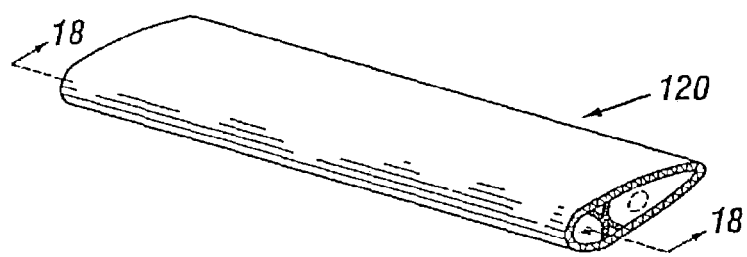
FIG. 17 is a perspective view, in enlarged scale, of an aircraft wing shown in FIG. 2.

Referring to FIGS. 14, 15, and 16, the assembly 218 is placed in a clam shell mold having two halves 220, 222 wherein the respective female mold faces have the desired external contour of the final wing structure. The mold is then closed and thereafter the matrix material is cured into a hardened condition by the application of heat, ultrasonic sound, light or pressure, or other methods known to one of ordinarily skilled in the art. Upon the application of heat and pressure to the assembly 218 by the respective mold faces 220, 222, the triangular mandrels 190 and inner skin mandrels 204, 206, 208, 210 contained within the assembly cooperate to apply compressive forces to the composite material disposed therebetween. That is, as heat is applied to the mold with the assembly 218 within the mold, the assembly 218, especially the matrix, expands at a higher rate than the mold, so the assembly 218 will pressurize itself. The compressive forces applied to the composite material act to remove air trapped between layers of composite and ensures that adjoining matrix material properly bonds together. Therefore, in most applications, the utilization of a clam shell mold eliminates the need for vacuum bagging and autoclaves.

In particular, with ultrasonic sound, it can cause the matrix material vibrates and heats up, thereby bonding the adjacent tubes together. With ultrasonic light, it can cause certain epoxies to vibrate, which heats up the epoxies to bond the adjacent tubes together.

Furthermore, before curing the matrix, colored gel may be applied to the outer layer to add color, to eliminate the need for painting the outer surfaces of the wing structure after it has been removed from the mold. Still further, aluminum outer skin may be applied to the outer layer of the assembly 218, then cured to provide additional strength to resist the loads, protection against lightning strikes, and to deflect back radar signals, if desired.

Those skilled in the art will appreciate that the curing of the matrix bonds adjacent triangular tubes and respective interior and exterior skins together to form an integral, monoque body. After the matrix has cured to a hardened condition, the mold halves 220, 222 are separated and the formed article 224 can be removed. Core mandrels 204, 206, 208, 210 and triangular mandrels 190 are then withdrawn from the structure thereby leaving hollow passageways extending therethrough.

If the mandrel cannot be withdrawn, other methods may be used. For example, a mandrel may be formed with a material having a melting temperature of 200° F.; and use a matrix material that has a curing temperature of 150° F., however, once the matrix is cured, it may have a plastic temperature of 400° F., i.e., temperature where the matrix is malleable. Accordingly, the mold along with the assembly 218 may be heated between 150° F. to 200° F., to cure the matrix, and once the matrix has solidified, the assembly may be once again heated between 200° F. to 400° F. to melt the mandrel so that it will flow out to leave the wing structure 120. Yet another method is to dissolve the mandrel out. For example, acid may be poured into the assembly 218, where the mandrel is designed to react with the acid but the wing structure is not, so the acid would dissolve the mandrels and leaving the wing structure intact. Alternatively, any other methods of removing the mandrel know to one of ordinarily skilled in the art is within the scope of the present invention.

It will be appreciated that the hollow passageways formed into the structure once the mandrels are removed provide areas where high pressure hydraulic lines, control cables, electrical lines, and the like, may be routed. In addition, the hollow triangular tube forming the shell may be filled with heated air diverted from the power plant (engine) to facilitate de-icing of the wing.

Furthermore, tiny holes drilled through the exterior skin and into the triangular tubes forming the shell to provide suction pipes which may be utilized to control laminar air flow over the wing, to minimize turbulence from occurring thereby reducing the drag on the wings. By way of background, as air flows over the wing, air remains laminar for about the first one third (⅓) of the cross-section of the wing, i.e., air flows smoothly across this cross section of the wing forming a boundary layer. However, as the air flows further along the chord of the wing, it slows down due to friction. This results in turbulence, which means that air is no longer smoothly flowing across the wing such that the boundary layer is running off of the wing. This results in higher drag. To minimize the turbulence, holes may be drilled to suck in the turbulent air through the triangular tubes so that the boundary layer is pulled back down, to allow the air to smoothly flow across the tail end of the wing. Additional holes may be placed further along the chord of the wing to maintain the boundary layer closer to the wing thereby maintaining the laminar flow. As a result, the aerodynamic drag is reduced to minimize fuel consumption.

The hollow passageways also provide a means of access to interior portions of the structure. Therefore, the passageways may be utilized to facilitate routine inspection of the structure using non-destructive methods of testing including ultra-sonic, magnetic and laser technologies. In addition, the large hollow areas formed into the structure after the core mandrels have been withdrawn may be utilized as internal fuel tanks.

Figure 18:
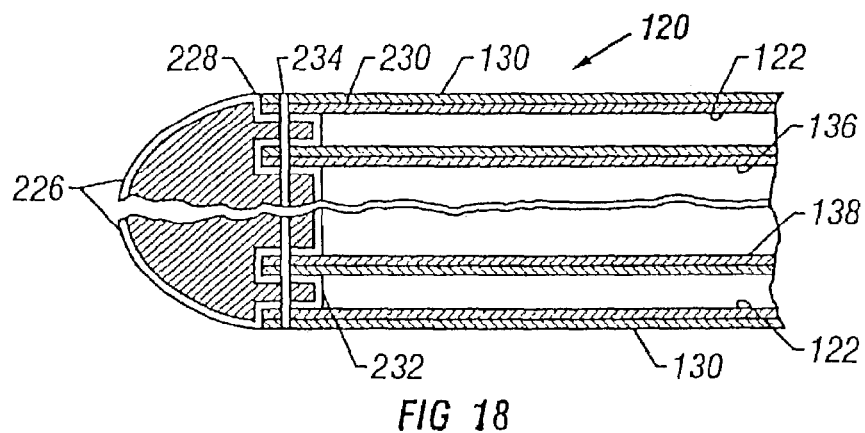
FIG. 18 is a longitudinal sectional view, in enlarged scale, of the wing shown in FIG. 17 with an end cap attached to the tip end.

As illustrated in FIG. 18 a molded fairing 226 may be attached to the wing tip end 228 of the wing structure 120 to provide an aerodynamic wing tip and prevent the tip from delaminating. The fibers on the tip of the wing may delaminate because after the mandrel has been wound, there may be excessive ends which may need to be cut off. Accordingly, ends may be exposed to the atmosphere, such as wind forces, and therefore etch away the matrix material to expose the fibers. To protect from delamination, the fairing 226 may be used to overlap the tip. To facilitate joining the fairing 226 to the adjacent composite wing structure 120, the fairing is formed with a series of plugs 230, 232 which are arranged in a pattern to fit inside the respective hollow triangular tubes 122 and respective channels 150, 152, 154, 156 (FIG. 2) created by the inner skin mandrels. Holes drilled through the wing structure and into the plugs 230, 232 allow pins 234 (FIG. 18) or other fastening devices to mechanically fasten the parts together.

While the fabrication of an entire wing structure as described in the present invention minimizes the number of joints in a structure thereby reducing both the weight and cost of the resulting airframe, mechanical joints are required to transmit loads between the composite wing structure and adjoining portions of the airframe. For example, two wing halves may be joined together or a wing half may be mated to a corresponding fuselage section.

Figure 19:
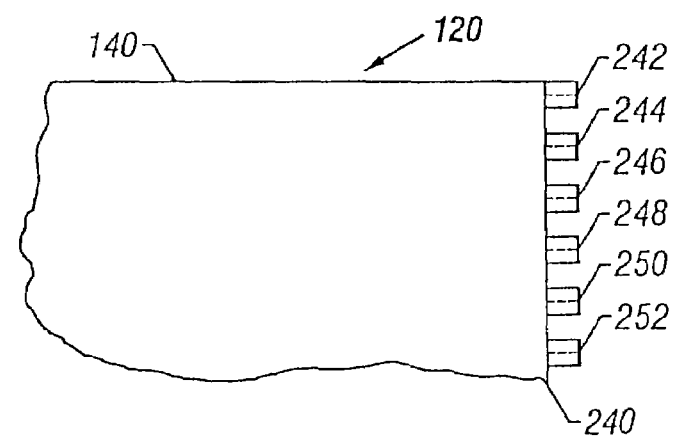
FIG. 19 is a fragmented top plan view, of the aircraft wing shown in FIG. 17 wherein plugs are inserted into the structure to facilitate joining components together.

As illustrated in FIG. 19, load bearing plugs, 242, 244, 246, 248, 250, 252 are mechanically fastened to the root 240 of the wing structure 120 and an adjoining fuselage segment to facilitate the transfer of loads therebetween. The plugs have a cross-section identical to the inner surface of the tubes 122 to fit inside the hollow triangular tubes 122 forming the load carrying core of the wing structure where mechanical fasteners are used to connect the parts together. It is envisioned that the load bearing plugs may be formed with metallic or polymer based materials. Unfortunately, graphite-epoxy materials are electrically conducting and cathodic with respect to most metals. Thus, to avoid the danger of galvanic corrosion of the metal side of a joint, special precautions are required.

In general, fasteners and metallic plugs made from aluminum alloys or steel should be avoided unless they can be insulated from graphite-epoxy composite. The preferred fastener material, particularly for bolts and lock pins, is titanium alloy, although stainless steel is also considered to be suitable.

Figure 20:
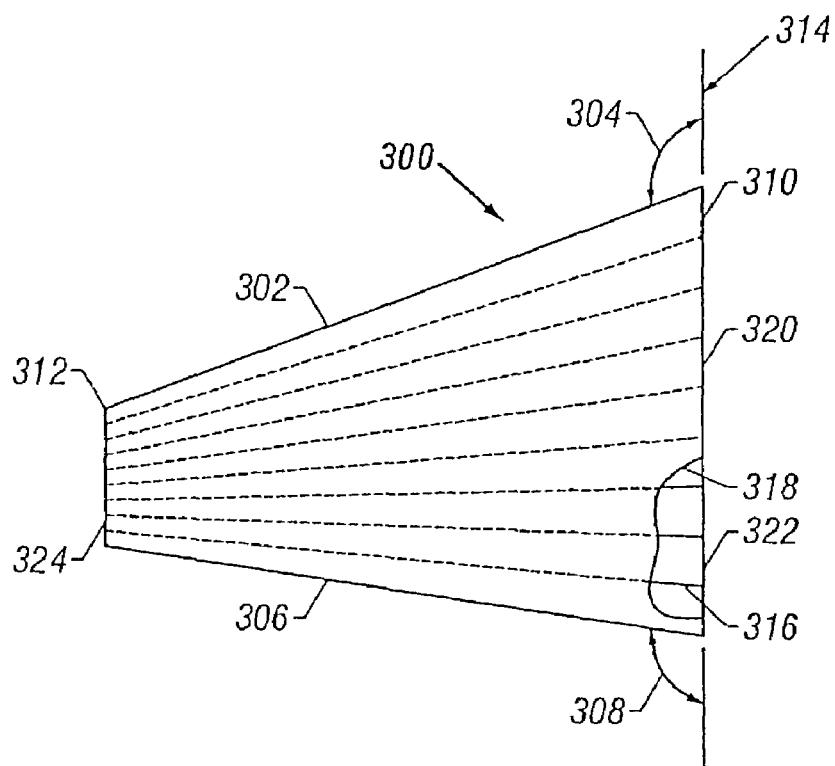
FIG. 20 is a top plan view, partially broken away, of a third embodiment of the filament wound load carrying structure of the present invention in the form of a tapered wing.

While the wing structure described above was illustrated as having a constant chord, swept wings having a desired taper ratio are also envisioned in the present invention. As shown in FIG. 20, wing structure 300 includes a leading edge 302 having a desired sweep angle 304, a trailing edge 306 having a desire sweep angle 308 with respect to the fuselage plane 314. In this embodiment, the respective sweep angles 304, 308 of the leading edge and the trailing edge 302, 306 cooperate to provide a generally trapezoidal shape platform. As a result, the chord located at the wing root 310 is larger than the chord located at the wing tip 312, thereby defining a desired taper ratio.

Like the previous embodiment, wing structure 300 includes a plurality of elongated thin-walled triangular tubes 316 placed co-extensively in a complementary side-by-side fashion which are bonded together to form a hollow core 320 having a desired external contour. As shown in FIG. 20, the triangular tubes 316 taper in laterally from the root end 322 to the wing tip end 324. Therefore, adjacent tubes cooperate to provide the desired taper ratio defining leading edge sweep angle 304 and trailing edge sweep angle 308. Note that for a swept wing, the angle 308 can be less than 90°. Outer skin 318 is bonded to the external surface of the core 320, and an inner skin (not shown) is bonded to the interior surface of the core. Similar to the previous embodiment, the core 320 and the respective inner and outer skins cooperate to provide an integrally formed monoque load carrying body of "sandwich" style construction. Likewise, if structurally required, the core 320 may be integrally formed with an underlying internal support member as shown in FIG. 2.

Figure 21A:
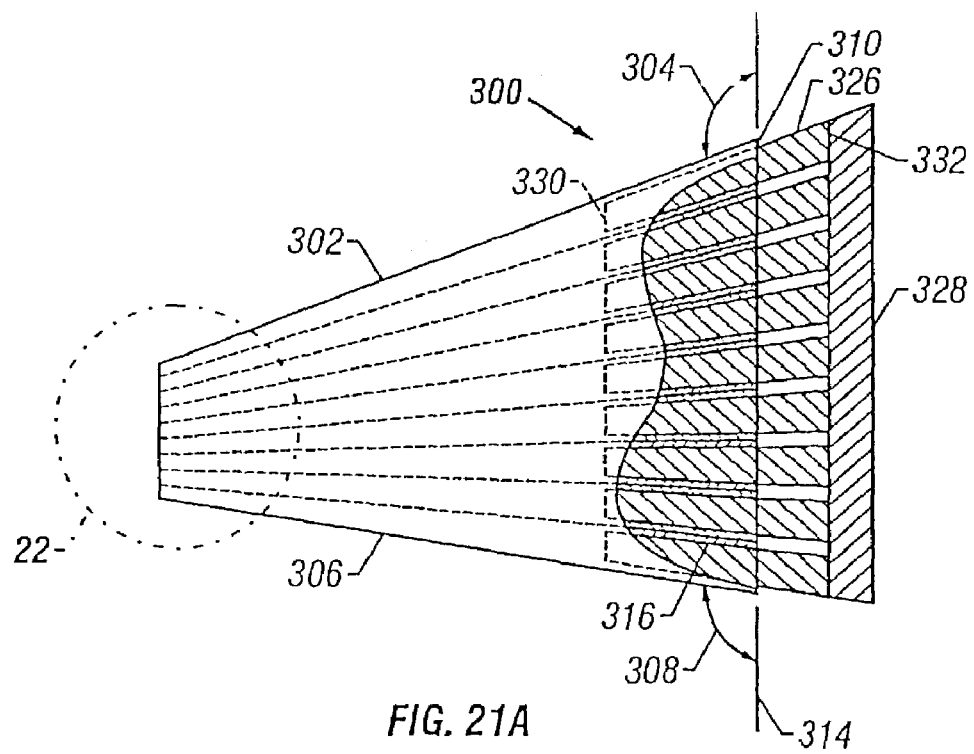
FIG. 21A is a plan view, partially broken away, of the wing shown in FIG. 20.

As illustrated in FIG. 21A, load bearing plugs 326 can be bonded to the root 310 of the wing structure 300 to facilitate the joining and transfer of loads between the wing and corresponding fuselage structure. The plugs 326 are generally triangular in transverse cross section having an outer end 330 and inner end 332. The outer end 330 of each plug 326 fits inside the root end of a hollow triangular tube 316 forming the load carrying shell where mechanical fasteners or adhesives are used to connect the parts together. Due to the tapered configuration of each triangular tube 316, the individual plugs 326 are formed with a complementary lateral taper allowing them to be slidably inserted into their corresponding hollow tubes. As such, the lateral taper and cross sectional dimensions of the plugs are designed to permit each plug to be inserted a desired distance inside its corresponding tube. When properly installed, the plugs 326 fit securely inside the tubes 316 wherein the external surfaces of the plugs contact the interior surfaces of the tubes. A load bearing frame 328 is mechanically fastened to the outer end 332 of the plugs thereby connecting adjacent plugs together. Alternately, the plugs may be directly connected to each other such that frame 328 is surplus.

It will be appreciated that for highly tapered wing structures, the corresponding lateral taper of the individual triangular tubes contained therein increases. As a result, the angle of insertion and direction of travel of each plug differs for each hollow tube forming the shell 320. Therefore, once the plugs are inserted into their respective tubes and joined together as an assembly by the frame 328, simple withdrawal of the plugs becomes geometrically impossible. Thus mechanical fasteners or adhesives used to connect the outer ends 330 of the plug to the wing structure may be eliminated.

Figure 21B:
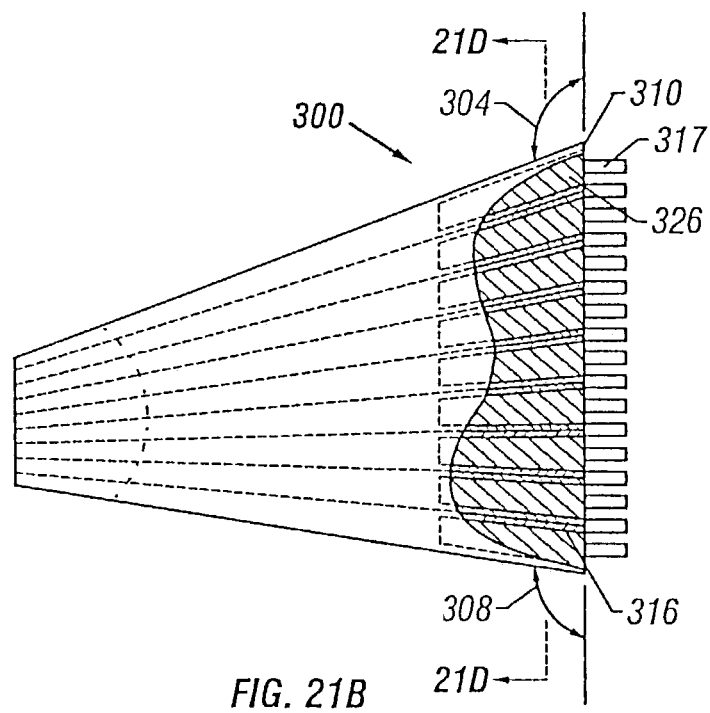
FIG. 21B is an another plain view, partially broken away, with flanges along the root end of the wing shown in FIG. 20.
Figure 21C:
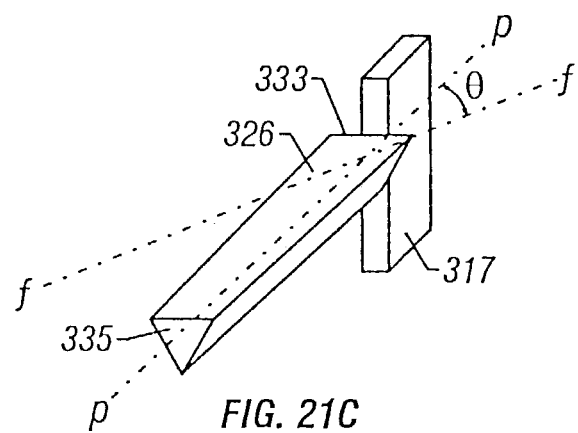
FIG. 21C is a perspective view of an exemplary plug with a flange on the root end of the plug.
Figure 21D:
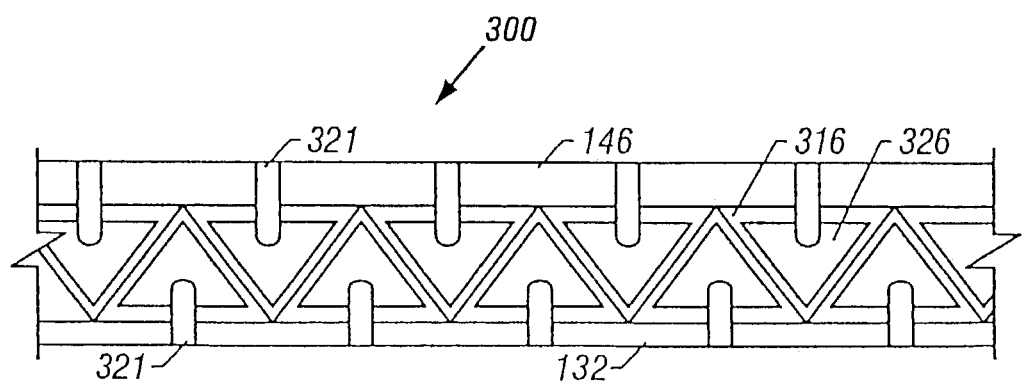
FIG. 21D is a cross-sectional view along 21D—21D along FIG. 21B, with exemplary pins to couple the plugs to the triangular tubes.

Alternatively, as illustrated by way of example in FIGS. 21B–21D, each of the plugs 326 may be adapted with a flange 317, in order to couple the wing structure 300 to the fuselage, which has been adapted to receive the flanges. To do so, as best shown in FIG. 21B, each of the respective flanges 317 have a longitudinal axis that is parallel to each other. As shown in FIG. 21C, to have parallel axes, each of the flanges are formed on the root end of it respective plugs at an angle θ between the plug and flange longitudinal axes p—p and f—f, respectively. In general, the longitudinal axis of flange f—f is perpendicular to the longitudinal axis of the fuselage. Accordingly, the plug for the triangular tube closest to the leading edge 302 would have an angle θ for the flange that is about the sweep angel 304 minus 90°. Of course, the angle θ will vary from flanges located near the leading edge 302 to flanges located near the trailing edge 306, so that all of the flanges are aligned. Also note that the plug 326 has a larger cross section along the root end 333 than the tip end 335, to match the corresponding tapered triangular tubes.

With regard to installing the plugs in the triangular tubs, as an example, if there are 100 triangular tubes running across the upper surface and another 100 triangular tubes running across the lower surface of the wing structure, up to 200 plugs with respective flanges may be fitted into all 200 triangular tubes. Of course, depending on the load along the root of the wing structure not all of the triangular tubes needs to have a plug with a flange. Once all of the necessary plugs are inserted into the corresponding triangular tubes such that all of the flanges align nested to each other; the flanges can be coupled together by a variety of means. For example, the adjacent flanges can be bolted together, bonded, and/or an elongated pin may be used to run through all of the flanges to couple all of the flanges together. Or any other methods know to one of ordinarily skilled in the art. Note that before the flanges are coupled, the individual plugs can be withdrawn from the respective triangular tubes; however, once the flanges are coupled together, the none of the plugs can be withdrawn as discussed above. Therefore, plugs are held within the triangular tubes even without such securing means as bolts and/or being bonded.

However, securing means as discussed above may be used to hold the plugs within the triangular tubes. For example, as illustrated by way of example in FIG. 21D, pins 321 may be used to further hold the plugs in respective triangular tubes. As further illustrated in FIG. 21D, the pins may be alternated across the upper and lower surfaces so that the pins penetrate through the base of the triangular wall rather than the tip where stresses tend to be high.

Once the flanges are coupled together, the wing structure can be coupled to the fuselage which is adapted to receive the coupled flanges. Alternatively, in situations where the wings are coupled to each other, the flanges can be used as the intermediary structure to coupled the two wings together. Note in cases where the wing gets damage, the flanges can be undone to remove the damaged wing, and replaced with a new wing. So that time for fixing a damage wing and the down time for the aircraft is significantly reduced.

Figure 22:
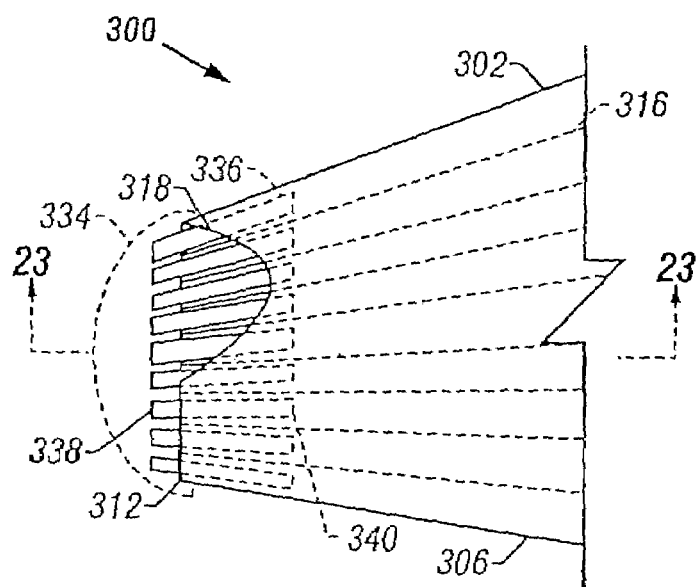
FIG. 22 is an enlarged view, taken from circle 22 in FIG. 21.
Figure 23:
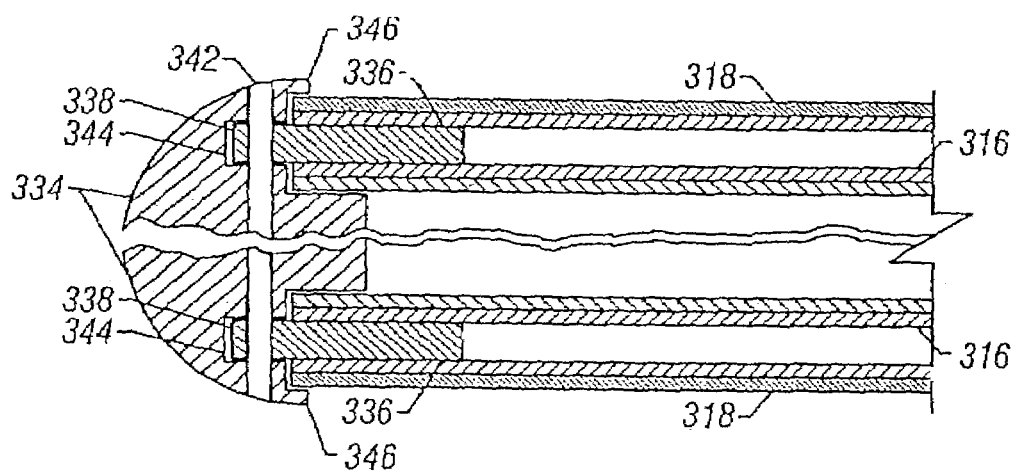
FIG. 23 is an enlarged cross-sectional view taken along line 23—23 in FIG. 22 with an end cap added.

Referring to FIGS. 22 and 23, a molded fairing 334 may be attached to the wing tip end 312 of the wing structure 300 to provide an aerodynamic wingtip. To facilitate the installation of the fairing 334, a series of end plugs 336 are installed in the triangular tubes 316 forming the shell 320. The end plugs 336 are generally triangular in transverse cross-section having an outer end 338 and an inner end 340. Due to the tapered configuration of each triangular tube 316, individual end plugs 336 are formed with a complementary lateral taper allowing them to be slidably inserted into their corresponding hollow tubes. As such, the lateral taper and cross-sectional dimensions of the end plug are designed to permit the outer end 338 to be inserted in the root end of a corresponding hollow tube. The end plugs 336 are then advanced within the hollow tubes until a desired portion of the outer ends extend beyond the wing tip end of the tube 12. It will be appreciated that the lateral taper and cross sectional dimensions of the end cap are designed to permit the outer end of each plug to advance a desired distance beyond the wing tip of the tube wherein the inner end of each plug 340 is retained within the corresponding hollow tube. When properly installed, the retained portion of each end plug fits securely inside the corresponding tube wherein the external surfaces of the cap contact the interior surfaces of the tube.

Referring to FIG. 23, the molded fairing 334 can be formed with a series of receptacles 344 which are arranged in a pattern to receive the exposed portions of the end caps extending beyond the wing tip end 312 of the triangular tubes 316. Holes drilled through the fairing 334 and into the end plugs 336 allow pins 342 or other fastening devices to mechanically fasten the parts together. Alternatively, the molded fairing may be a shell (not shown) to enclose the wing tip end 312 with a hole drilled through the shell so that it can be pined to the wing tip. Additionally, the molded fairing may be adhered to the wing tip end.

The molded fairing also includes a retaining flange 346 disposed about the perimeter of the fairing which projects longitudinally. The flange 346 is configured such that upon the installation of the fairing, the inner surface of the flange overlaps the outer skin 318 of the wing structure thereby protecting the wing tip end 312 of the wing structure 300 from exposure to the environment and prevent delamination.

Figure 24:
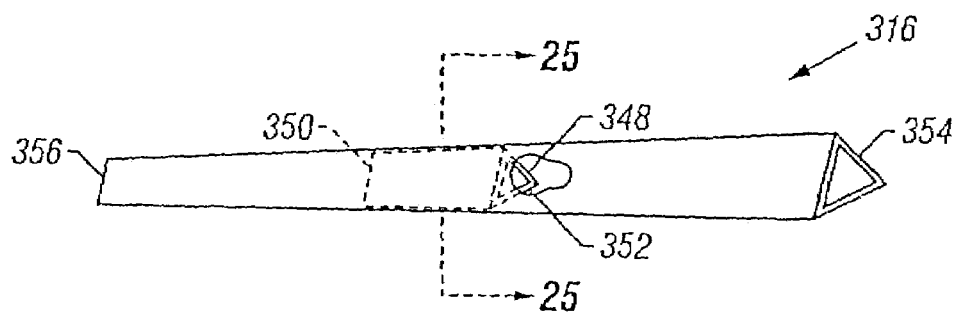
FIG. 24 is an enlarged perspective view, partially in section, of a triangular tube included in the structure shown in FIG. 20.

As discussed above, end plugs 336 and plugs 326 are slidably inserted into the hollow triangular tubes forming the core 320 to provide a means for joining structural components to the respective ends of the wing structure 300. Referring to FIG. 24, in a similar fashion, structural inserts 348 are positioned within the hollow triangular tubes 312 to provide structural reinforcement for local areas of the wing structure where hardware may be attached. As illustrated, in FIGS. 24 and 25, a triangular insert 348 having an outer end 350 and an aft end 352 is positioned within the hollow interior of a triangular tube 316. The outer end 350 of the insert 348 fits inside the root end 354 of the hollow triangular tube. The insert is then advanced along the interior of the tube to the desired location. Where the triangular tube 316 is formed with a lateral taper, the insert is formed with a complementary taper. As such, the lateral taper and cross sectional dimensions of the insert are designed to permit the insert to be advanced a desired distance within the triangular tube 316. The insert is designed such that when it is advanced to a desired location along the length of the tube the insert fits securely inside the tube wherein the external surfaces of the insert contact the interior surfaces of the tube. Holes are then drilled through the composite structure and into the insert to facilitate the attachment of hardware to the structure. These plugs can also be used to repair and/or reinforce areas of the structure that have been damaged.

As shown in FIG. 26, an alternate embodiment of the load bearing structure of the present invention is in the form of an integrally formed composite fuselage structure 400 including a plurality of elongated thin-walled filament wound triangular tubes 402 placed co-extensively in a complementary side-by-side fashion and bonded together to from a hollow circularly shaped core 404 having a desired circular cross-section. Cross-sections of oval, square, rectangular or trapezoidal are also possible. Skins 406, 408, 410 bonded to the external and internal surfaces of the core cooperate therewith to provide an integrally formed, unitary load carrying body of "sandwich" style construction. The shell is integrally formed with an internal support member 412 spanning across the hollow interior of the fuselage structure thereby connecting opposite sides of the shell together. The support member 412 is formed with a plurality of elongated thin-walled filament wound triangular tubes 414 bonded together in a complementary side-by-side fashion to provide, for example, a ceiling or floor panel extending the length of the fuselage structure.

It will be appreciated that, in practice, while the core 404 may not make a classic smooth circle on its inner surface, it will often tend to have the generally circular configuration. In any event, the filament wound tubes 402 will be abutted side by side and having longitudinal, centrifugal and helical windings will generally cooperate to efficiently resist forces in a multitude of directions. The composite wall will also resist radially inwardly acting forces, such as might be encountered by wind forces acting radially inwardly. That is, the load generated by such inwardly acting forces will generally apply a compressive load across the cross section of such tube so that the walls thereof are generally placed in compressive load in the transverse plane. Also, it will resist outward forces generated by pressurization. Also, as different loads are applied longitudinally along the body of the fuselage resulting in various torque loads being applied to the tubular structure defining such fuselage, the efficient, integral, circularly shaped composite wall will result in the filament wound tubes cooperating together as a composite hollow circular beam to efficiently resist such bending forces.

Furthermore, the triangular tubes running longitudinally along the axis of the fuselage may have constant cross-section throughout, i.e., not tapered, because the load along the longitudinal axis is similar. In such a case, withdrawing the mandrel from the triangular tubes may be more difficult than if it was tapered. Here, however, rather than removing the mandrel, it may be left in the triangular tubes to serve as an insulating material to keep the internal temperature warm, especially in high altitudes where temperature can be below −50° F.; and serve as a sound deadening insulator to keep the engine noise out. In this case, the mandrel may be made of strong lightweight foam. Furthermore, the mandrel left in the triangular tubes also adds stiffness to the tubes such that the mandrel help resist the loads on the tubes. Thus, leaving the mandrel in the tubes eliminates the need to install additional insulation layers, which saves weight and lower the cost of producing the plane. Of course, mandrels in some of the triangular tubes may be removed to serve as a duct to pump oxygen, heated air, or cables therethrough, among other things.

In another embodiment as shown in FIG. 27A, an integrally formed fuselage structure 450 includes a plurality of elongated filament wound triangular tubes 452 placed co-extensively in a complementary side-by-side fashion and bonded together to form a hollow core 454 having a desired circular cross-section. Outer skin 462 and inner skin 464 are bonded to the external and internal surfaces of the core and cooperate therewith to provide an integrally formed, unitary load carrying body of "sandwich" style construction.

It will be appreciated that in highly loaded areas of the fuselage structure, the triangular tubes forming the core 454 may be arranged in a manner to provide increased load carrying capability. As shown in FIG. 27A, in lightly loaded areas of the fuselage structure, such as top section 466 and bottom section 468, the core 454 is formed with a single row of triangular tubes positioned in an alternating inverted pattern. In highly loaded areas of the structure, such as along side sections 470, 472 which are joined to wing halves 474, 476, additional rows 458, 460 of triangular tubes 452 are added to increase the localized load carrying capability of the structure. This eliminates the need for wing carry-through structure (or center section).

Figure 27B:
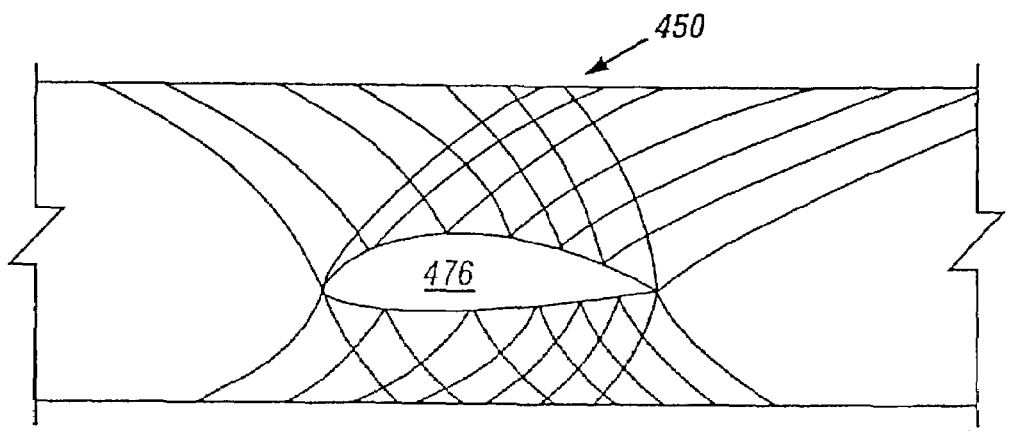
FIG. 27B is a side of the fifth embodiment of the filament wound structure of FIG. 27A, illustrating distribution of the load along the structure.

Furthermore, as illustrated by way of example in FIG. 27B, in addition to the rows 458, 460, the fuselage would be wound in a controlled orientation to distribute the load throughout the fuselage the load being transferred from the wing. That is, the load from the wing is distributed in a wide area of the fuselage to prevent longitudinal buckling of the fuselage.

Figure 28:
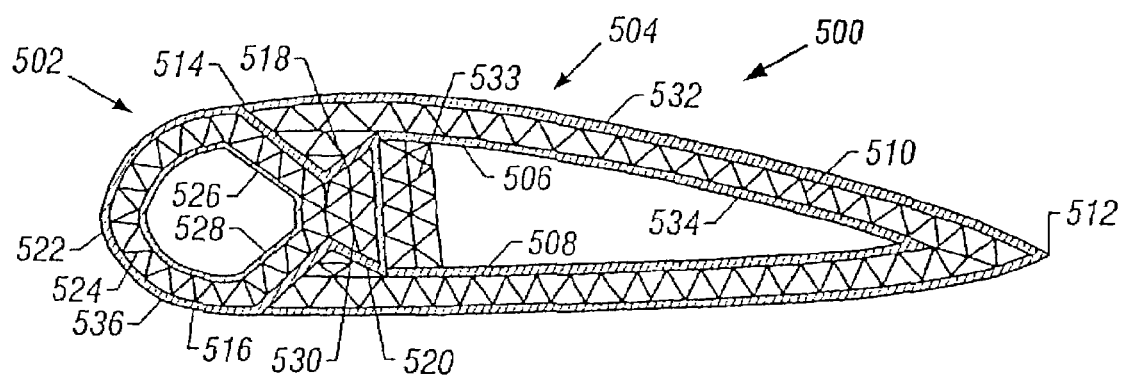
FIG. 28 is a cross-sectional view of a sixth embodiment of the filament wound load carrying structure of the present invention comprising of an aircraft wing formed in sections which fit together with tongue and groove joints.

Referring to FIG. 28, the embodiment of the filament wound load bearing structure shown therein is also in the form of a wing 500 formed with a leading section 502 and trailing section 504 The trailing section 504 is configured with top and bottom walls 506 and 508, respectively, constructed of filament wound triangular tubes 510 and arranged so that such top and bottom walls diverge forwardly from a trailing edge 512 to terminate in respective forward ends 514 and 516. Mounted on the inside of the respective top and bottom walls are respective longitudinally projecting triangular filament wound tubes which cooperate to form coupling lugs 518, 520. The leading section 502 is formed with a rounded forwarded wall defining a leading edge 522 and is constructed with the filament wound triangular tubes 524 to define such wall so that the top and bottom walls thereof project rearwardly and formed with rearward sections 526 and 528 which converge inwardly and are formed at their rear portion with a dovetail shaped keeper, generally designated 530, which is configured to slidably engage behind the respective coupling lugs 518 and 520. The tubes 510 and 524 are wound with longitudinal, circumferential and helical winds to optimize the resolution of stresses.

Figure 29:
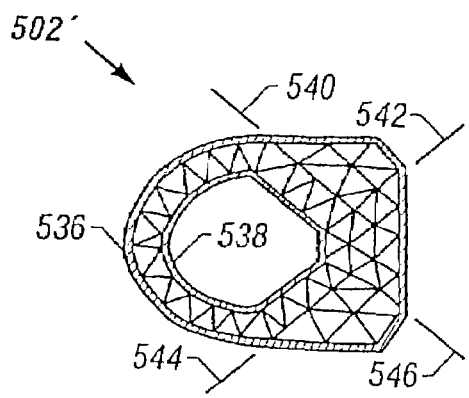
FIG. 29 is a cross-sectional view of an unfinished blank utilized in making the leading section incorporated in the wing shown in FIG. 28.
Figure 30:
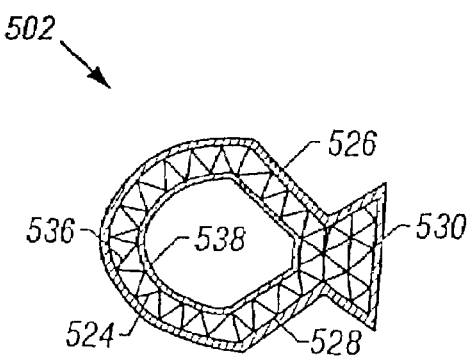
FIG. 30 is a cross-sectional view of the finished leading section incorporated in the wing shown in FIG. 28.

Referring to FIGS. 29 and 30, the leading section 502 may be formed around a removable mandrel wherein the triangular tubes 524 are arranged to define a tooling blank 502' in the configuration shown to define an assembly having an outer skin 536 and an inner skin 538 attached thereto (FIG. 29). The blank 502' is constructed at its back wall with multiple layers of tubes 524 so that selected ones thereof may be removed to form the tongue 530. The assembly is then cured to form an integral unitary body. The desired final shape of the leading section 502 (FIG. 30) is obtained by machining away selected outer layers of tube structure defined by the intersection of cutting planes 540, 542 and 544, 546. Thereafter, the remaining structure includes a rounded leading wall defining leading edge 522, the inwardly converging segments 526 and 528 and the keeper tongue 530 (FIG. 30).

Figure 31:
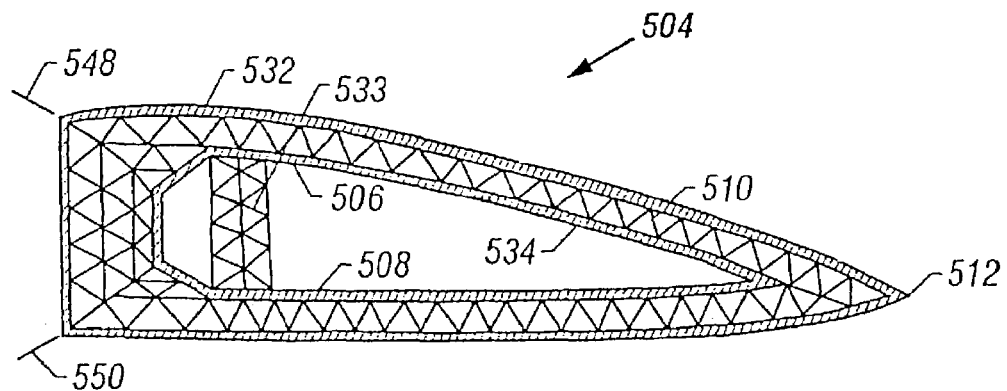
FIG. 31 is a cross-sectional view of an unfinished blank utilized in making the trailing section of the wing shown in FIG. 28.
Figure 32:
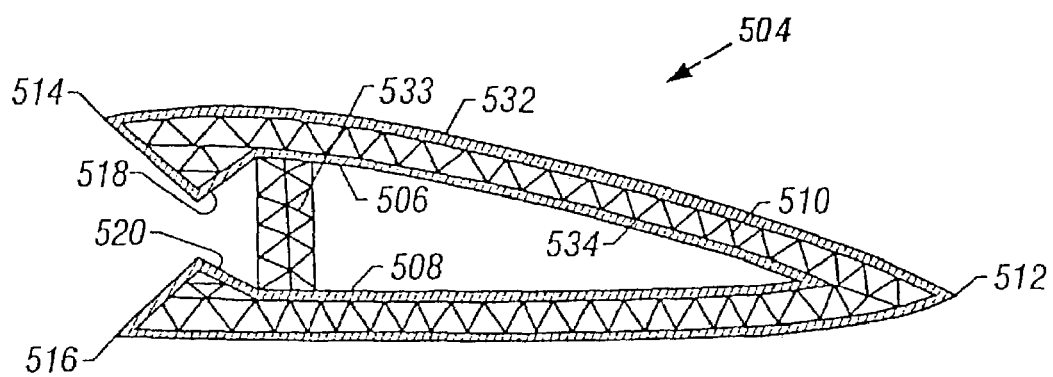
FIG. 32 is a cross-sectional view of the finished, trailing section shown in FIG. 28.

As shown in FIGS. 31 and 32, the trailing section tooling blank 504' may likewise be formed around a removable mandrel. The triangular tubes 510 are laid out on the mandrel in the configuration shown to form a tooling blank 504' having multiple layers of tubes 510 at the front wall and including an outer skin 532 and an inner skin 534 (FIG. 31).

The assembly is then cured to form an integral unitary body of revolution having a top wall 506 and a bottom wall 508. Furthermore, a cross brace 533 may be used to couple the top and bottom walls together to keep the walls from coming apart and to maintain the integrity of the walls. The final shape of the trailing section 504 (FIG. 32) is obtained by machining away selected layers of tube structure defined by the intersection of cutting planes 548 and 550. As a result, the remaining structure includes top and bottom walls 506 and 508 which diverge forwardly from trailing edge 512 to terminate in respective forward ends 514 and 516. Triangular tubes near the forward ends 514, 516, left behind after the machining stage, cooperate to provide lugs 518 and 520 which project inwardly from top and bottom walls 506 and 508, respectively.

The leading and trailing sections 502 and 504 may then be coupled together, after the curing and machining stages, by sliding the keeper 530 longitudinally into the trailing section 504 engaged behind the respective coupling lugs 518 and 520. It will be appreciated that in the case of a longitudinally tapered wing, such keeper 530 will be tapered outwardly from the root end thereof. The keeper 530 will be bonded or mechanically fastened in place, joined to the respective lugs 518 and 520 to create an integral wing structure. Then, when the resultant aircraft is assembled and the airfoil applied to various loads, the respective filament wound tubes 510 and 524 will cooperate to maintain the structural integrity and shape of the airfoil and of the keeper 530 and the filaments wound thereon will serve to efficiently carry the different bending and torsional loads applied to the wing.

Figure 33:
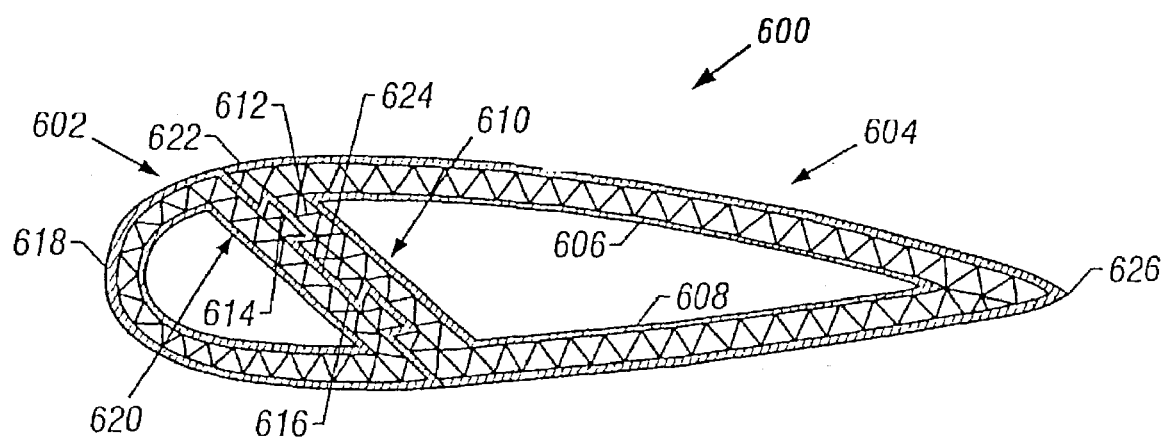
FIG. 33 is a cross-sectional view of a seventh embodiment of the filament wound load carrying structure of the present invention comprising of an aircraft wing formed in sections having coupling joints.

The contoured load bearing structure shown in FIG. 33 is similar to that shown in FIG. 28 and is in the form of an airfoil which might act as an airplane wing, generally designated 600. Such wing is also made up of leading and trailing sections 602 and 604. The trailing section 604 is formed by top and bottom walls 606 and 608 diverging upwardly and forwardly from trailing edge 626. The walls 606, 608 are joined by means of a coupling wall, generally designated 610, constructed by a wall configured by the triangular filament wound tubes 612. Such coupling 610 angles generally downwardly and rearwardly from the front edge of the top wall 606 and is formed with alternate grooves and tongues 614 and 616.

With continued reference to FIG. 33, the leading section 602 is formed with a wall defining a rounded leading edge 618, such wall extending rearwardly to form top and bottom walls joined at their respective rear edges by means of a leading section coupling, generally designated 620. The coupling 620 includes an alternating tongues 622 and grooves 624 shaped complementally to cooperate with the respective grooves 614 and tongues 616 so that such leading and trailing sections 602 and 604 may be coupled together.

As illustrated in FIGS. 34 and 35, to fabricate the leading section 602 a leading section 602' is formed around a removable mandrel wherein triangular tubes 630 are arranged in the configuration shown (FIG. 34) to define an assembly having an outer skin 626 and an inner skin 628. The assembly is cured and the resulting structure is machined to provide a coupling 620 having grooves 624 and tongues 622.

Likewise, a trailing section tooling blank 604' is formed around a removable mandrel wherein triangular tubes 632 are arranged in the configuration shown (FIG. 34) to define an assembly having an outer skin 634 and an inner skin 636. The assembly is cured and the resulting structure is machined to provide a coupling 610 having grooves 614 and tongues 616.

The leading section 602 and trailing section 604 are joined by sliding the tongues and grooves together longitudinally and bonding-or mechanically fastening them in place as described above with respect to the wing 500. The resultant airfoil structure then provides an integral construction which is lightweight and possesses attractive load carrying abilities. The labyrinth of tongue and groove construction incorporated in the coupling members 610 and 620 form a high integrity bond leaving open areas in the wing for fuel storage tanks, communication lines and the like. Thus, as in the case of the wing 500, the resultant structure affords a highly efficient load carrying structure for the particular loads typically applied to an airfoil.

It will be appreciated that the embodiments depicted in FIGS. 28 and 33 illustrate the construction of hybrid structures having adjoining sections formed with different material combinations. The modular construction of leading section 502, 602 and a trailing section 504, 604 (FIGS. 28 and 33) provides an ability to form structural combinations having desired material properties in a specific regions of the structure. For example, where aerodynamic heating is a concern, leading section 602 may be formed with a composite material which is capable of withstanding elevated temperatures. Alternatively, leading section 602 may be formed with a composite material having ablative properties. In contrast, trailing section 604 may be formed with a different composite material which is capable of providing improved impact resistance, load carrying characteristics, compression strength or the like. Therefore, when the leading section 602 and trailing section 604 are joined to from an integral body, the combined structure will be uniquely tailored to meet various design requirements.

It is also envisioned that the modular style construction mentioned above may be utilized to join a structural section embodying the-present invention with a solid metallic or composite section. As a result, the joined sections would cooperate to form a load carrying body having a desired external contour wherein at least a portion of the contour is defined with a combination of triangular tubes.

Another embodiment of the present invention, as illustrated in FIG. 36A, includes a wing 650 comprising a wing box 652, leading section 654, trailing section 656, slat 658, and flaps 660, 662. These components are fabricated individually using the techniques disclose above and then joined together to produce a fully integrated wing structure. For example, as illustrated by way of example in FIGS. 36B–36D, the flap 600 may be made by the following process. Initially, as shown in FIG. 36B, a sandwich structure 651 is formed, using the methods described above, having an upper surface 653 and base surface 655; and based on the load, an internal support 657 may also be provided to couple the upper and base surfaces together. The upper surface is contoured to form the desired upper surface of the flap. Next, as shown in FIG. 36C, unwanted sections of the sandwich structure 651 is machined away. Thereafter, as shown in FIG. 36D, to enclose the area that has been machined away, a plate 659 having a convex shape may be attached to the sandwich structure 651, thereby forming an air foil shape flap 660 for nesting. Alternatively, a composite tubular structure may be used to enclosed the sandwich structure 651. Of course, similar process may be used to make the slat. Accordingly, with the above process, flaps and slats with concave inner surfaces can be readily made.

The wing box 652 includes a plurality of elongated thin-walled triangular tubes 664 placed coextensively in a complementary side-by-side fashion which are bonded together to form a hollow core 666 having a desired external contour defining a forward surface 700 and an aft surface 702. The shell can also be integrally formed with an internal support member 668 having an X-shaped cross-section spanning across the hollow interior of the wing box 652, thereby connecting opposite sides of the shell together. The shell is also integrally formed with gussets 670, 672, 674, 678 which extend between adjacent sides of the shell. The legs of the support member 668 and gussets 670, 672, 674, 678 are formed with a plurality of elongated thin-walled triangular tubes 680, 682 which are bonded together in a complementary alternating inverted fashion. Outer skin 685 and inner skins 686, 688, 690, 692, 694, 696, 698, 699 are bonded to the external surfaces of core 666 and cooperate therewith to provide an integrally formed, unitary loading carrying structure.

The leading section 654 includes a plurality of elongated thin-walled triangular tubes 704 placed co-extensively in a complementary side-by-side fashion which are bonded together to form a hollow core 706 having a desired external contour to provide a leading edge 712 and a mating surface 714. Outer skin 708 and inner skin 710 are bonded to the external and internal surfaces of core 706 and cooperate therewith to provide an integrally formed, monoque body of "sandwich" style construction. It will be appreciated that the mating surface 714 of the leading section may be mechanically fastened or bonded to the forward surface 700 of the wing box 652. As such, the leading section 654 and wing box 652 cooperate to form integrated load bearing structure.

Similarly, trailing section 656 includes a plurality of triangular tubes 716 disposed between an outer skin 718 and an inner skin 720. The trailing section may be cured and machined as previously described to provide a mating surface 722 and a desired trailing edge contour 724. The mating surface 722 may then be mechanically fastened or bonded to the aft surface 702 of the wing box 652 wherein the leading section 654, wing box 652, and trailing section 656 cooperate to form an integrated load bearing structure.

Likewise, slat 658, and flaps 660 and 662 are formed of the general construction 10 mentioned above to provide load carrying bodies which may be machined to a desired final external contour. The slat and flaps are then attached to the structural combination formed by the leading section 654, wing box 652, and trailing section 656 to provide a fully integrated wing structure 650.

Figure 38:
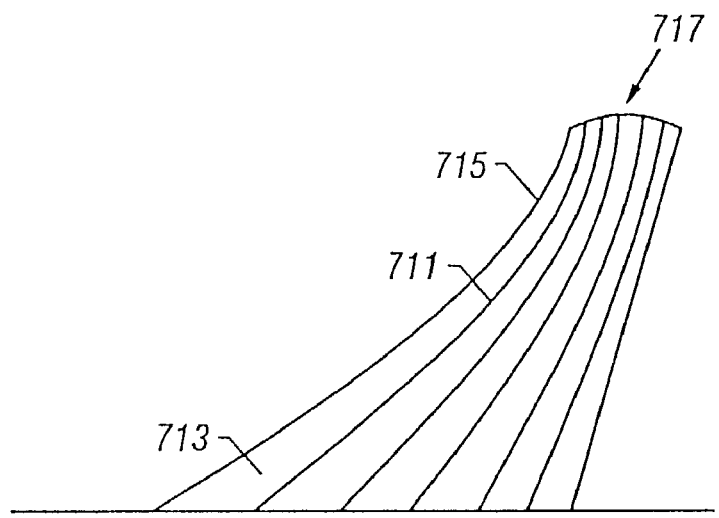
FIG. 38 is a top plan view of yet another embodiment of the filament wound load carrying structure of the present invention in the form of a curved wing.

As illustrated by way of example in FIG. 38, the wing structure is not limited to a straight tapered wing design as shown in FIG. 22, rather triangular tubes may be used to construe a curved wing structure 717. Here, the triangular tubes 711 and the mandrels 713 are curved so that when it is wound with fibers it takes on the shape of the desired curved wing structure 717 along the leading edge side 715. Once the fiber wound curved wing structure is cured, the curved mandrels may be withdrawn as before, similar to withdrawing a curved knife from its housing.

From the foregoing, it will be appreciated that the filament wound elongated load bearing structure of the present invention can efficiently and economically be formed to define lightweight hollow structures having highly desirable characteristics for airframes and the like. The resultant structure is particularly efficient in that the various areas and locations within the structure itself can possess different layers and cross-section of filament, different wind or gauge of filament wind and, depending on the particular loads to be carried in that location, the pitch of the wind can be varied for the particular stresses applied to the various selected locations in the structure. The resultant airframe thus is economical to manufacture and will have a long and carefree life.

Figure 39:
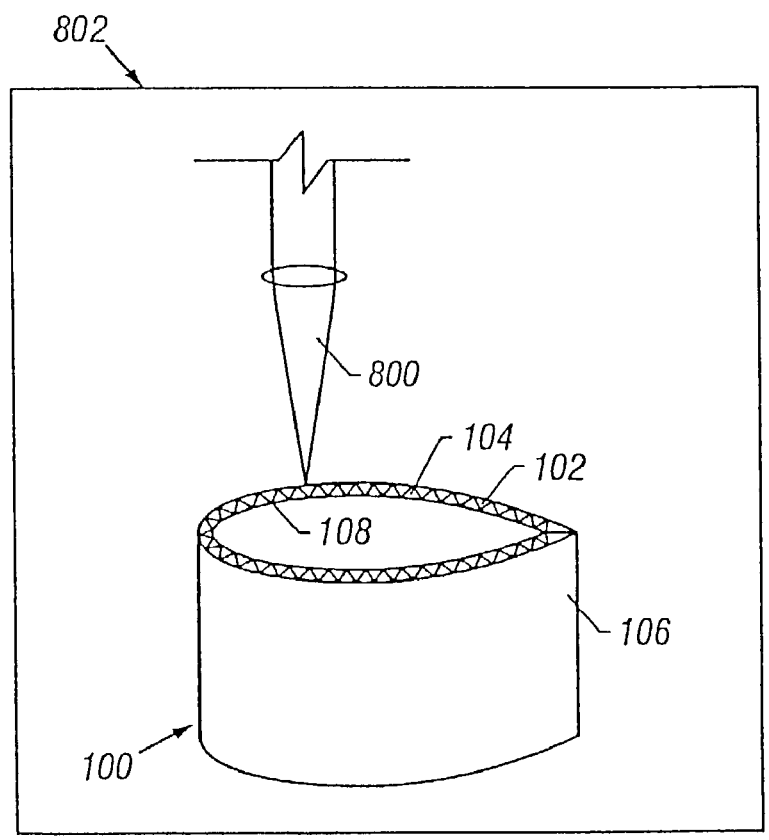
FIG. 39 is perspective view of a structure being formed from a Laser-assisted Chemical Vapor Deposition process.

As illustrated by way of example in FIG. 39, an alternative process of constructing a structure, such as the wing structure 100 of FIG. 1, is a Laser-assisted Chemical Vapor Deposition (LCVD) process by which a solid deposit is formed from gaseous reactants in the presence of high temperatures. LCVD, differs from the traditional Chemical Vapor Deposition (CVD) process in that it uses a laser beam as the heat source. Therefore, instead of uniformly coating the substrate and furnace walls with the CVD process, a localized deposit forms near the focus of the laser beam to form material deposits. As the fiber grows the substrate or the laser may be pulled away at a speed matching the fiber growth rate.

As an example, a laser beam 800 may be programmed to trace the cross-section of the wing structure 100 shown in FIG. 39, i.e., the triangular tubes 102 forming the core 104, and the outer skin 106 and the inner skin 108, all within a gaseous reactant chamber 802. Accordingly, a layer of localized deposition of fibers would occur as the laser beam passes through the cross-section of the structure due to the heat generated from the laser. Of course, the laser beam would make a number of passes through the cross-section, each time laying an another layer on top of the previous layer of material, until the structure is formed. Additionally, the internal support member 126, as shown in FIG. 2, may also be formed through the LCVD by tracing the laser beam through the cross section of the support member 126.

With regard to strength, fibers formed of carbon may carry a load level of about 600,000 PSI to 1,000,000 PSI. Due to its high strength, wing structure formed from the LCVD process can have significant strength to weight ratio improvement.

In closing, it is noted that specific illustrative embodiments of the invention have been disclosed hereinabove. However, it is to be understood that the invention is not limited to these specific embodiments. For example, the present invention may be used to construct bicycle frames, boat hulls, vehicle frames, concert stages where the stage is put together and taken down frequently, walls and roofs for homes and commercial buildings, and roads where a plurality of predetermined length of planner tubular constructions may be laid over or elevated above a road site. In other words, the present invention is not limited to the embodiments discussed above. With regard to manufacturing, extrusion process may also be used to manufacture the wing structure, if the cross-sectional area of the wing is constant. With respect to the claims, it is applicant's intention that the claims not be interpreted in accordance with the sixth paragraph of 35 U.S.C. § 112 unless the term "means" is used followed by a functional statement.

The invention claimed is:

1. A method of forming a load carrying shell, comprising:
   rotating a mandrel having a contoured shape to form the load carrying shell;
   winding fibers around the mandrel to form an inner skin of the load carrying shell;
   placing fiber wound triangular tubes in side-by-side relationship on the inner skin, where at least one of the fiber wound triangular tubes is adapted to couple to another load carrying structure;
   winding fibers around the fiber wound triangular tubes to form an outer skin of the load carrying shell;
   forming a fiber wound plug having an inner end and an outer end;
   inserting the inner end of the fiber wound plug to another end of the at least one fiber wound triangular tube; and inserting the outer end of the plug to the another load carrying structure adapted to receive the outer end of the plug.

2. The method according to claim 1, further including: bonding the inner skin, fiber wound triangular tubes, and outer skin together.

3. The method according to claim 1, further including: bonding concurrently the fibers of the fiber wound triangular tubes, inner skin, and the outer skin together.

4. The method according to claim 2, further including: removing the mandrel.

5. The method according to claim 1, further comprising: placing the load carrying shell into a mold; and heating the mold to bond the inner skin, fiber wound triangular tubes, and the outer skin together.

6. The method according to claim 1, further comprising: placing the load carrying shell into a mold; and pressurizing the mold to bond the inner skin, fiber wound triangular tubes, and the outer skin together.

7. The method according to claim 1, where the load carrying shell is an airfoil having a rounded leading edge that tapers to form a trailing edge.

8. The method according to claim 1, where the load carrying shell is an airplane fuselage.

9. The method according to claim 1, where the fiber wound triangular tubes taper in along the longitudinal direction to one end of the tubes.

10. The method according to claim 9, where the load carrying shell is a wing for an airplane.

11. The method according to claim 1, where a portion of the fiber wound triangular tubes has one side that is round, where the round sides of the fiber wound triangular tubes are faced outwardly to provide a curved surface.

12. The method according to claim 1, where the winding of fibers over the curved surface of the fiber wound triangular tubes form the outer skin that is curved.

13. The method according to claim 1, further including: forming another load carrying shell; and coupling the load carrying shell to another load carrying shell.

14. The method according to claim 1, further including: inserting a pin through the predetermined fiber wound triangular tube and the plug to couple the plug to the predetermined fiber wound triangular tube.

15. The method according to claim 1, where the step of placing the fiber wound triangular tubes is done to assemble multiple layers of the tubes, and further including:
removing selected portions of the tubes to form a keeper; and
inserting the keeper into lugs formed in another load carrying section to couple the load carrying section to another load carrying section.

16. A method for forming a load carrying structure, comprising:
winding fibers to form an inner skin of a load carrying structure;
placing fiber wound triangular tubes in side-by-side relationship on the inner skin to assemble multiple layers of the tubes;
winding fibers over the filament wound triangular tubes to form an outer skin of the load carrying structure;
removing selected portions of the tubes to form a keeper; and
inserting the keeper into lugs formed in another load carrying section to couple the load carrying section to another load carrying section.

17. The method according to claim 16, where the fibers have a triangular cross-section.

18. The method according to claim 16, further applying metal matrix to the fibers.

19. The method according to claim 16, where the fibers are pre-impregnated with matrix material.

20. The method according to claim 19, where the matrix material is a metal matrix.

21. The method according to claim 18, further including bonding the metal matrix to the fibers by heating the metal matrix.

22. The method according to claim 16, further including plating the outer skin of the load carrying structure with an aluminum outer skin.

23. The method according to claim 16, further including monitoring the structural integrity of the load carrying structure.

24. The method according to claim 16, further including aligning the fibers along the direction of the local stress on the load carrying structure.

25. The method according to claim 16, where the step of winding the fibers to form the inner skin is done by winding the fibers over a mandrel that is adapted to rotate about an axis.

26. The method according to claim 25, further including: removing at least a portion of the mandrels in the fiber wound triangular tubes.

27. The method according to claim 25, where the mandrel is an insulating material.

28. The method according to claim 25, further including: dissolving the mandrel to remove the mandrel.

29. The method according to claim 16, where each of the filament wound triangular tube is wound with fibers aligned in predetermined directions to carry the stress on that filament wound triangular tube.

30. The method according to claim 16, further including bonding the inner skin, filament wound triangular tubes, and the outer skin together.

31. The method according to claim 30, further including coloring the load carrying structure during the bonding process.

32. The method according to claim 16, further including: sucking outside air through the fiber wound triangular tubes to minimize turbulence as the load carrying structure passes through the outside air.

33. The method according to claim 16, where one end of the load carrying structure is open, and further including: enclosing the open end of the load carrying structure with a fairing.

34. The method according to claim 33, further including: inserting a structural insert through the triangular tube along a predetermined location along the longitudinal axis of the triangular tube to provide structure reinforcement.

35. The method according to claim 16, further including: incorporating an internal support member to support the inner skin of the load carrying structure.

* * * * *